United States Patent
Watanabe et al.

(10) Patent No.: US 9,390,247 B2
(45) Date of Patent: Jul. 12, 2016

(54) INFORMATION PROCESSING SYSTEM, INFORMATION PROCESSING APPARATUS AND INFORMATION PROCESSING METHOD

(71) Applicants: Taichi Watanabe, Kanagawa (JP); Kaori Sukenobe, Tokyo (JP)

(72) Inventors: Taichi Watanabe, Kanagawa (JP); Kaori Sukenobe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/205,681

(22) Filed: Mar. 12, 2014

(65) Prior Publication Data

US 2014/0282991 A1 Sep. 18, 2014

(30) Foreign Application Priority Data

Mar. 15, 2013 (JP) ................................. 2013-054314
Feb. 24, 2014 (JP) ................................. 2014-033388

(51) Int. Cl.
*H04L 29/06* (2006.01)
*G06F 21/34* (2013.01)
*G06F 21/31* (2013.01)
(Continued)

(52) U.S. Cl.
CPC ............... *G06F 21/34* (2013.01); *G06F 21/31* (2013.01); *G06F 21/44* (2013.01); *H04L 63/0853* (2013.01); *H04L 63/18* (2013.01); *H04W 12/06* (2013.01)

(58) Field of Classification Search
CPC ..... G06F 21/34; G06F 21/31; H04L 63/0853; H04L 63/18; G07F 7/1008; G06Q 20/34
See application file for complete search history.

(56) References Cited

U.S. PATENT DOCUMENTS 7,577,660 B2  8/2009  Ohtani
2007/0019215 A1  1/2007  Yu
(Continued)

FOREIGN PATENT DOCUMENTS

JP  2005-262498  9/2005
JP  2008-071233  3/2008
(Continued)

OTHER PUBLICATIONS

Extended European Search Report dated Nov. 26, 2014.

*Primary Examiner* — Chau Le
*Assistant Examiner* — Ghodrat Jamshidi
(74) *Attorney, Agent, or Firm* — IPUSA, PLLC

(57) ABSTRACT

An information processing apparatus receives user information and a request, generates authentication information in response to the request, stores the authentication information associated with the user information, receives the authentication information from a terminal apparatus and device identification information identifying the terminal apparatus, stores the device identification information and the user information stored associated with the authentication information in a manner of associating them with one another when information coincident with the received authentication information is stored, determines, when receiving the user information, the device identification information and a service request from the terminal apparatus, whether information coincident with the user information and information coincident with the device identification information are stored, and provides a service concerning the service request when determining that information coincident with same the user information and information coincident with the same device identification information are stored.

9 Claims, 19 Drawing Sheets

(51) Int. Cl.
*G06F 21/44* (2013.01)
*H04W 12/06* (2009.01)

(56) References Cited

U.S. PATENT DOCUMENTS

| | | |
|---|---|---|
| 2007/0079135 A1 | 4/2007 | Saito |
| 2009/0103124 A1* | 4/2009 | Kimura et al. ............... 358/1.15 |
| 2010/0225653 A1* | 9/2010 | Sao et al. ...................... 345/520 |
| 2011/0216347 A1* | 9/2011 | Kikuchi ....................... 358/1.14 |
| 2013/0152169 A1* | 6/2013 | Stuntebeck ............. G06F 21/00 726/4 |
| 2014/0033292 A1* | 1/2014 | Moore et al. ....................... 726/9 |
| 2014/0283010 A1* | 9/2014 | Rutkowski et al. ............. 726/18 |

FOREIGN PATENT DOCUMENTS

| | | |
|---|---|---|
| JP | 2008-077145 | 4/2008 |
| WO | 2012/005653 | 1/2012 |
| WO | 2012/135563 | 10/2012 |

\* cited by examiner

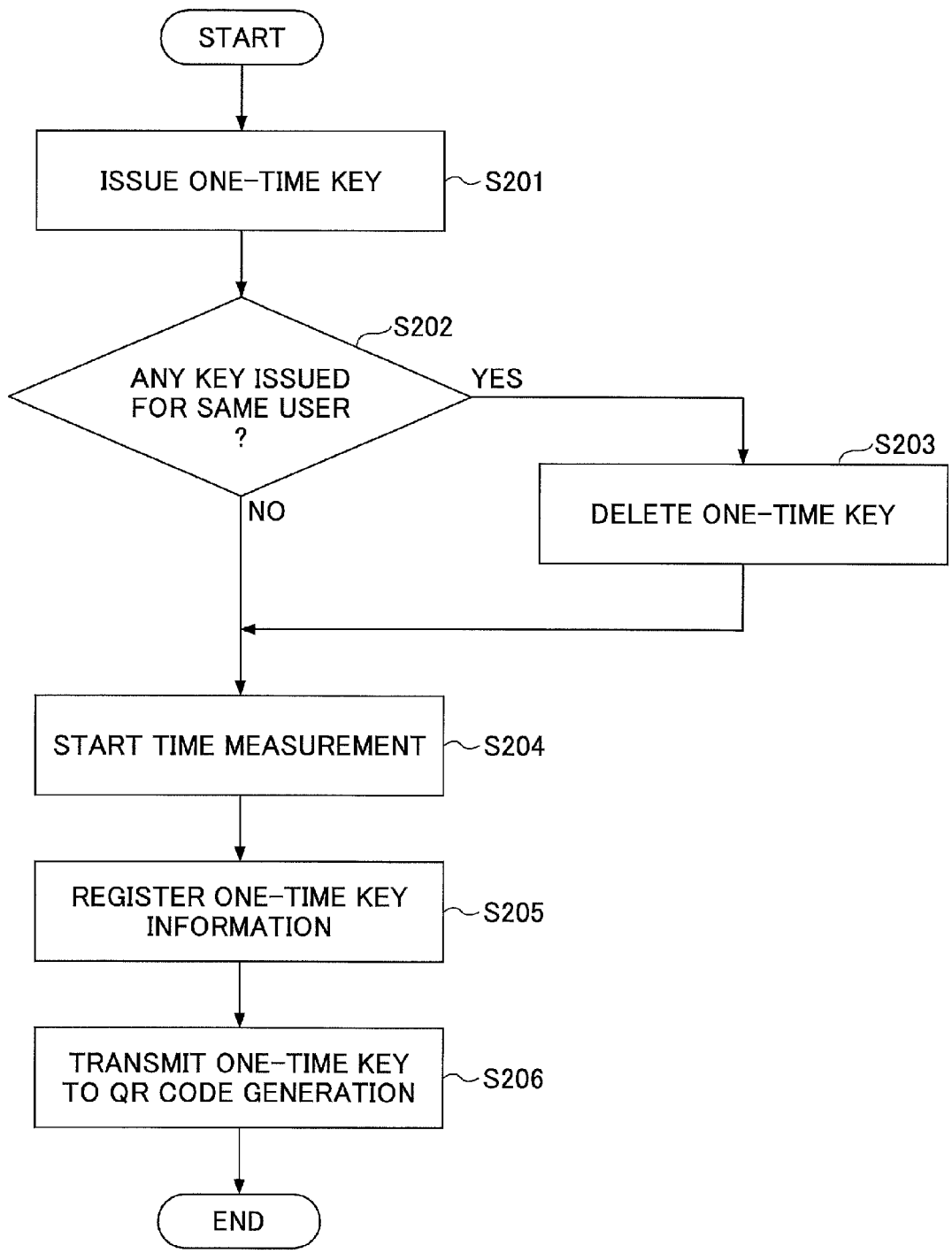

QR CODE
READ QR CODE USING DEDICATED APPLICATION

{"serverID" : "aaa-bbb-ccc" , "IPAddress" : "192.168.0.1" ,
"relayAddress" : "relay.test.co.jp" , "oneTimeKey" : "0123456789"]

FIG.13

```
["oneTimeKey" : "0123456789" , "deviceName" : "testDevice" ,
"deviceType" : "Tablet" , "UUID" : "aaaaaaaa-bbbb-cccc-dddd-eeeeeeeeeeee"]
```

FIG.16 {"username": "testUser" , "userPassword" : "testUserPass"}

{
serverID : "aaa-bbb-ccc" ,
Authorization : "testUser : testUserPass" ,
Access-Device : " aaaaaaaa-bbbb-cccc-dddd-eeeeeeeeeee"
}

INFORMATION PROCESSING SYSTEM, INFORMATION PROCESSING APPARATUS AND INFORMATION PROCESSING METHOD

BACKGROUND OF THE INVENTION

1. Field of the Invention

The present invention relates to an information processing system, an information processing apparatus and an information processing method.

2. Description of the Related Art

For example, Japanese Laid-Open Patent Application No. 2008-071233 (Patent Document No. 1) discusses a technology that is for the purpose of preventing a third party from obtaining information. According to this technology, common information is created using a portable terminal and the created information is transmitted to an authentication apparatus and a user terminal. The user terminal generates authentication information from the received common information and transmits the generated authentication information to the authentication apparatus. The authentication apparatus also creates authentication information from the received common information and confirms whether the created authentication information is coincident with the authentication information received form the user terminal. When they are coincident, the authentication apparatus further confirms whether the common information received from the user terminal is coincident with the common information stored in the authentication apparatus. When they are coincident, the authentication apparatus determines that the user terminal is a valid one.

However, in this technology, when the common information is inadvertently disclosed, confidential information may be obtained by a third party.

SUMMARY OF THE INVENTION

According to one aspect of the present invention, an information processing system comprises an information processing apparatus including a reception part that receives information concerning a user and a request for generating authentication information, an authentication information generation part that generates authentication information in response to the request received by the reception part, a first storage part that stores the authentication information associated with the information concerning a user, a receiving part that receives the authentication information transmitted from a terminal apparatus and device identification information that is used to identify the terminal apparatus, a second storage part that stores the device identification information received by the receiving part and the information concerning a user stored associated with the authentication information in a manner associating them with one another when information coincident with the same authentication information received by the receiving part is stored by the first storage part, a determination part that determines, when the information concerning a user, the device identification information and a service use request transmitted by the terminal apparatus are received, whether information coincident with the same information concerning a user and information coincident with the same device identification information are stored by the second storage part, and a service providing part that provides a service concerning the service use request when the determination part determines that information coincident with the same information concerning a user and information coincident with the same device identification information are stored. The information processing system further comprises the terminal apparatus in which a computer executable program is installed. The terminal apparatus includes an authentication information obtaining part implemented by executing the computer executable program by a computer to obtain the authentication information from the information processing apparatus, an authentication information transmission part implemented by executing the computer executable program by the computer to transmit the authentication information obtained by the authentication information obtaining part and the device identification information of the terminal apparatus to the information processing apparatus, and a service request transmission part implemented by executing the computer executable program by the computer to, after the authentication information and the device identification information of the terminal apparatus are transmitted by the authentication information transmission part, transmit the information concerning a user, the device identification information and the service use request to the information processing apparatus.

Other objects, features and advantages of the present invention will become more apparent from the following detailed description when read in conjunction with the accompanying drawings.

BRIEF DESCRIPTION OF THE DRAWINGS

FIG. 8 is a flowchart illustrating a flow of processes at a time of one-time key issuance in the information processing system shown in FIG. 1;

FIG. 13 shows an example of data transmitted from the smart device at a time of device registration in the information processing system shown in FIG. 1;

FIG. 16 shows an example of data transmitted from the file server at a time of success (completion) in device registration in the information processing system shown in FIG. 1;

DETAILED DESCRIPTION OF THE EMBODIMENT

Figure 1:
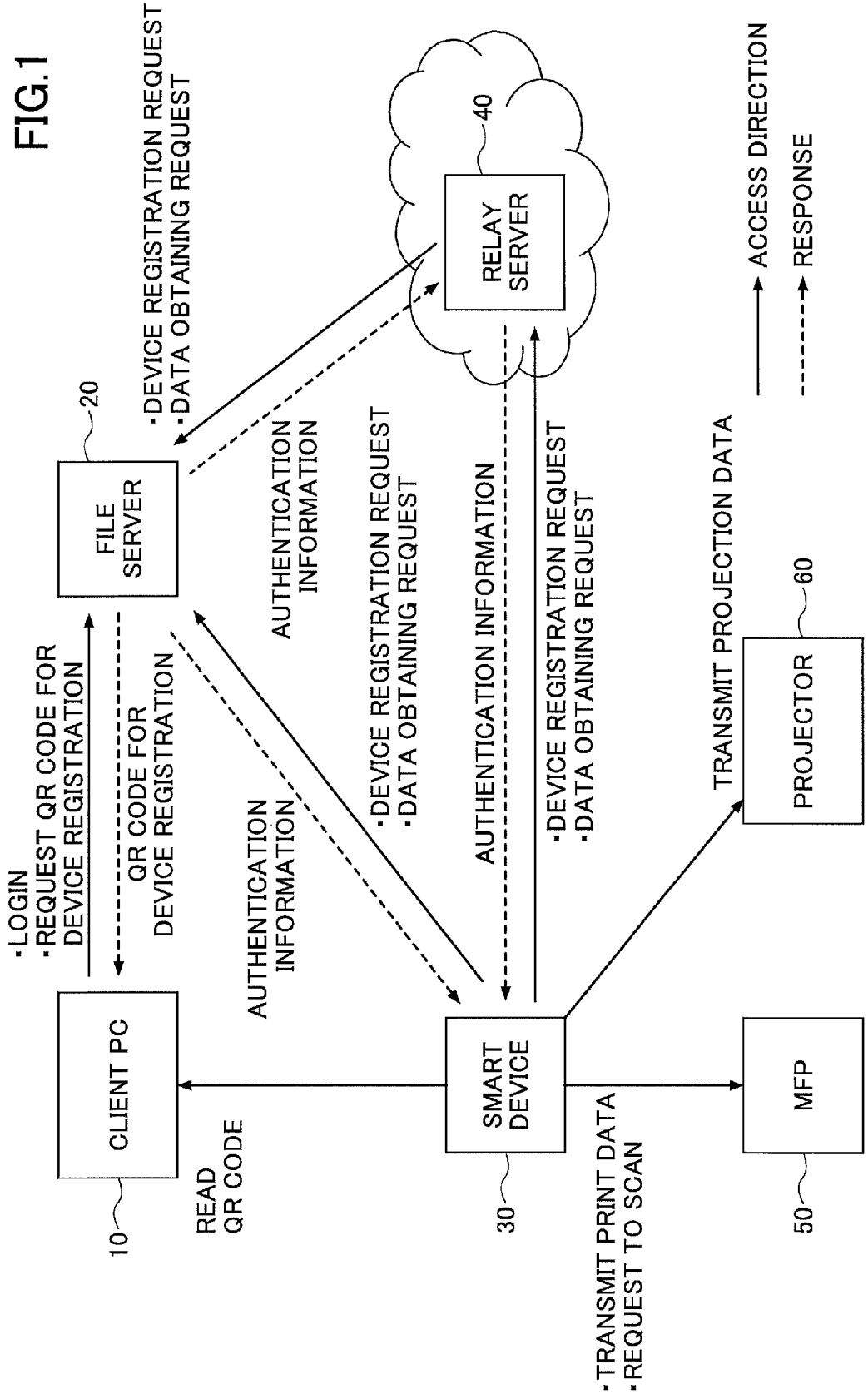
FIG. 1 illustrates an example of the overall configuration of an embodiment.

Below, using the drawings, the embodiment of the present invention will be described in detail.

The embodiment has been devised in consideration of the problem described above concerning Patent Document No. 1, and an object is to provide a configuration by which it is possible to prevent access to an information processing apparatus even when information concerning a user is inadvertently disclosed.

The embodiment is an information processing system including a file server that has a function of creating an image file of JPEG or the like from a file of Word or PowerPoint, for example.

According to the file server, by converting a document of Word or the like into an image file, it is possible to easily print, without using a PC, a file stored in the file server even from a platform such as a smartphone by which it is not possible to print a Word file.

It is also possible to carry out file operations by accessing the file server by a smart device such as a smartphone from a visiting destination. Generally speaking, in order to access a file server, user authentication is carried out after inputting a user name (or a user ID, in the same manner hereinafter) and a password that are previously set by a terminal that is used. However, by its nature, a smart device may be stolen or lost at a visiting destination in a relatively high likelihood, and as a result, there may be a relatively high risk that a file server is accessed by a third party.

According to the embodiment, it is possible to prevent a third party from accessing a file server even when a user name and/or a password is inadvertently disclosed.

That is, according to the embodiment, a smart device used when a file server is used is authenticated in association with a user. Note that such a method of authentication or a method of registering authentication information to be used for service request may be called "pairing". Therefore, successful authentication cannot be achieved unless a user name and/or a password are used with a smart device simultaneously. Thus, even when a user name and/or a password are inadvertently disclosed, successful authentication cannot be achieved through only the user name and/or the password. As a result, even when a user name and/or a password are inadvertently disclosed, it is possible to prevent access to the file server. In other words, it is possible to prevent access to the file server by so-called "spoofing".

More specifically, according to the embodiment, when a smart device is registered with file server, pairing is carried out in a manner of associating device information of the smart device with user information of a user who uses the smart device.

That is, the user logs in to the system of a file server from a client PC and thereafter requests the file server to generate a QR code (registered trademark) for device registration. The QR code for device registration includes a random value (for example, a one-time key). The one-time key is temporarily stored in a memory of the file server in association with (pairing with) the user name. Note that the QR code for device registration is one example of an authentication information image for device registration. The one-time key is one example of authentication information for device registration.

Then, when the QR code for device registration thus provided by the file server is read by the smart device, a device registration request is transmitted to the system of the file server from the smart device. This request includes the one-time key and an authentication part in the file server then carries out authentication using the one-time key. Thus, it is determined whether the one-time key is proper and valid.

When successful authentication of the one-time key is thus achieved, the file server registers the user name that is stored in associating with the one-time key in a manner of associating it with the device information as information to identify the owner (user) of the smart device. That is, the user name of the user who requested the issuance of the QR code for device registration is registered in association with the device information. Thus, the smart device and the user's account are associated with one another on a one-to-one basis.

Thus, in a database of the file server, the smart device is registered with the device information. Then, the file server transmits the user's account information concerning the user's registration to the smart device. As a result, in the smart device, the account information of the user who is thus registered as the owner is set.

Thereafter, by simultaneously using the user's account and the smart device, it is possible to use the file server. Thus, even when the user's account information is inadvertently disclosed, it is not possible that the file server is used by only the user's account information.

Further, even when the smart device itself is lost or stolen, the user can delete the device information from the file server by logging in to the file sever in a procedure described later using FIG. 23. After thus deleting the device information, it is not possible that a successful authentication is achieved even when the device information and the account information are used simultaneously. Therefore, it is possible to prevent a third party from accessing the file server. When the user wishes to use the file server, the user is to again carry out device registration with the file server using a new smart device in the same procedure as that mentioned above.

Below, the embodiment will be described in detail using the drawings.

Using FIG. 1, an information processing system according to the embodiment will be described.

The information processing system includes a file server 20, a client PC 10, a smart device 30, a relay server 40, a MultiFunction Peripheral (MFP) 50 and a projector 60. These apparatuses are connected together by a network. The network may be a wired network or a wireless network. The network may be a LAN, a WAN, the Internet, a public telephone network, a cellphone network or the like. It is also possible to combine two or more of the various types of networks.

Note that the smart device 30 is not limited to a smartphone, a tablet or the like. For example, a terminal apparatus of another type can be used as the smart device 30 as long as it has the functions of the smart device 30 that will be described later as a result of an application program being installed therein. Alternatively, a terminal apparatus that has the same functions when it is manufactured can also be used as the smart device 30.

Further, in the information processing system shown in FIG. 1, when the smart device 30 accesses the file server 20, for example, via a cellphone network such as a 3G network, the smart device 30 accesses the file server 20 via the relay server 40. In this case, there may be a plurality of file servers usable via the relay server 40. By using "server IDs", described later, for example, it is possible to identify a file server thereamong to use actually. The file server 20 may be an on-line storage system that provides a so-called cloud service.

Further, although not shown in FIG. 1, electronic apparatuses other than the above-mentioned MFP 50 and projector 60 can be connected in the information processing system. These other electronic apparatuses that can be connected in the information processing system can include not only a MFP(s) and/or a projector(s) but also a monitor(s), an electronic blackboard(s) (interactive whiteboard(s)), a microphone(s), a camera(s), a TV conference system(s), and/or the like.

In the information processing system of FIG. 1, a user logs in to the file server 20 using the client PC 10. Then, in the log-in state, the user sends a request to the file server 20 to display a QR code for device registration and causes the file server 20 to display the QR code for device registration on a display unit (not shown) of the client PC 10.

Then, the user uses a camera (camera module) of the smart device 30 to read the thus displayed QR code for device registration, transmits necessary information (described later) to the file server 20 by the smart device 30 and thus requests device registration from the file server 20. Then, when the device registration succeeds in the file server 20, the user is allowed to obtain data from the file server 20 using the smart device 30. Also, the user is allowed to read a list of the thus obtained data and/or print or project the data by sending the data to the MFP 50 or the projector 60.

Next, using FIG. 2, a hardware configuration example of the file server 20 will be described.

Figure 2:
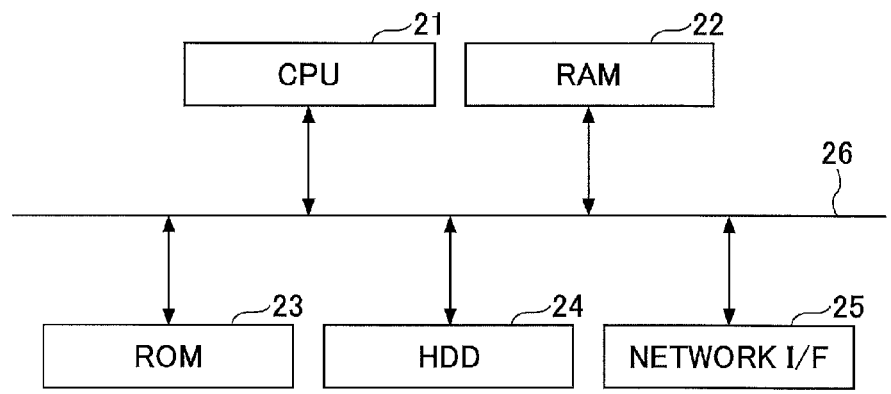
FIG. 2 is a block diagram illustrating one example of a hardware configuration of a file server shown in FIG. 1.

As shown in FIG. 2, the file server 20 shown in FIG. 1 has a configuration the same as or similar to a common server or a PC.

That is, in the file server 20, a Central Processing Unit (CPU) 21, a Random Access Memory (RAM) 22, a Read Only Memory (ROM) 23, a Hard Disk Drive (HDD) 24 and a network I/F 25 are mutually connected via a bus 26. A LAN, a WAN, the Internet or the like is connected to the network I/F 25.

The CPU 21 is an arithmetic and logic unit and controls the entire operations of the file server 20.

The RAM 22 (one example of a storage unit) is a volatile storage medium from which information can be read and to which information can be written at high speed and is used by the CPU 21 as a work area.

The ROM 23 is a non-volatile storage medium for which only reading can be carried out and stores a program(s) such as firmware.

The HDD 24 (another example of the storage unit) is a non-volatile storage medium from which information can be read and to which information can be written and stores an Operating System (OS), various sorts of control programs, application programs and so forth.

In the hardware configuration such as that shown in FIG. 2, a program is read out from the ROM 23, the HDD 24 or another storage medium, such as an optical disk not shown, into the RAM 22, and is executed by the CPU 21 using other hardware. As a result, the various functions of the file server 20 (described later using FIG. 4) are implemented.

Next, using FIG. 3, a hardware configuration example of the smart device 30 will be described.

Figure 3:
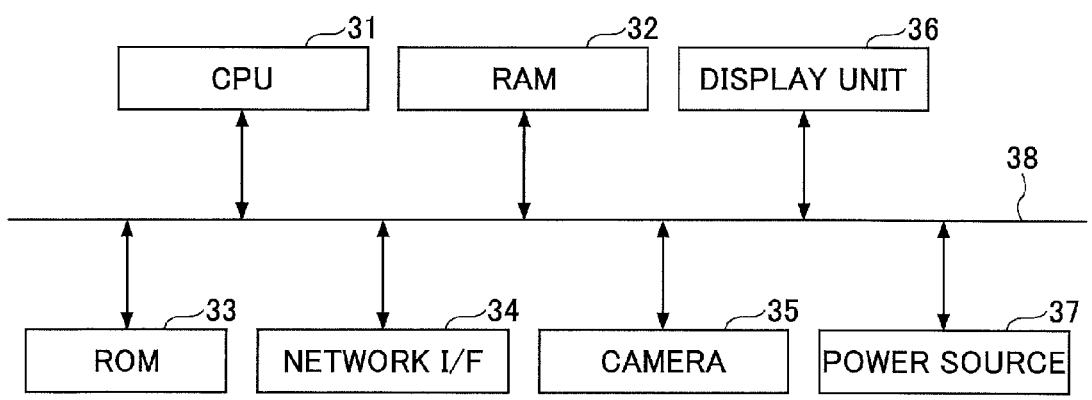
FIG. 3 is a block diagram illustrating one example of a hardware configuration of a smart device shown in FIG. 1.

As shown in FIG. 3, the smart device 30 includes, for example, a configuration the same as or similar to a common smartphone.

That is, in the smart device 30, a CPU 31, a RAM 32, a ROM 33, a network I/F 34, a camera module 35, a display unit 36 and a power source 37 are mutually connected via a bus 38. A LAN, a WAN, the Intent or the like is connected with the network I/F 34.

The CPU 31 is an arithmetic and logic unit and controls the entire operations of the smart device 30.

The RAM 32 is a volatile storage medium from which information can be read and to which information can be written at high speed and is used by the CPU 31 as a work area.

The ROM 33 is a non-volatile storage medium for which only reading can be carried out and stores a program(s) such as firmware.

In the hardware configuration such as that shown in FIG. 3, a program is read out from the ROM 33 into the RAM 32 and is executed by the CPU 31 using other hardware. As a result, various functions of the smart device (described later using FIG. 5) are implemented.

Next, a functional configuration example of the file server 20 will be described using FIG. 4.

Figure 4:
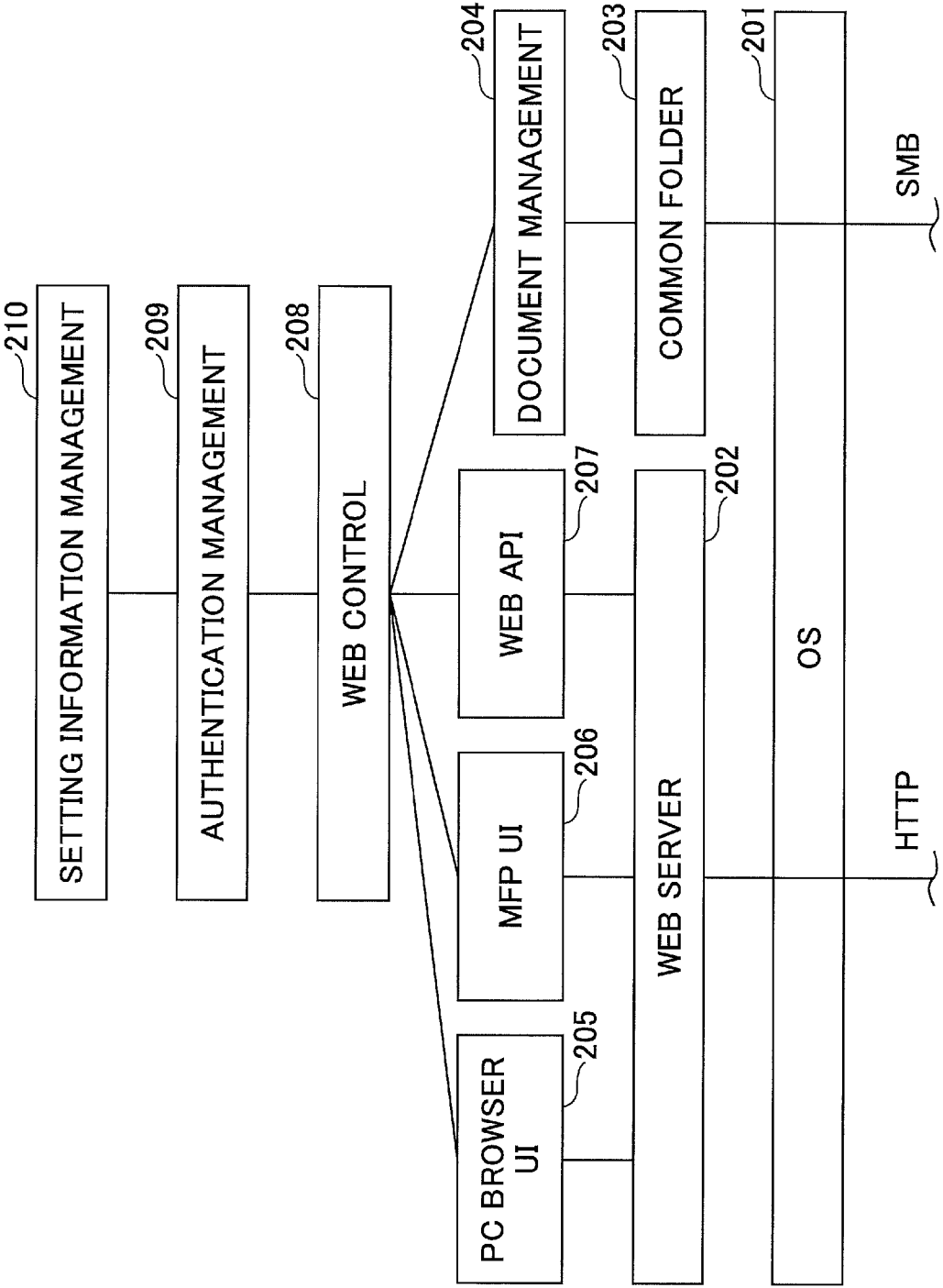
FIG. 4 is a block diagram illustrating one example of a functional configuration of the file server shown in FIG. 1.

As shown in FIG. 4, the file server 20 includes an OS 201, a Web server 202, a common folder 203, a document management part 204, a PC browser User Interface (UI) (system setting part) 205, a MFP UI 206, and a Web API 207. The file server 20 further includes a Web control part 208, an authentication management part 209 and a setting information management part 210.

The OS 201 is an operating system of the file server 20 and controls the entirety of the system of the file server 20. For example, the OS 210 is Windows (registered trademark), Linux (registered trademark), MAC, Android or the like.

The Web server 202 is software for transmitting and receiving information by HTTP. For example, the Web server 202 can be Apache Tomcat, IIS or the like.

The common folder 203 is a folder opened to the network by a SMB protocol. A user is allowed to access the common folder 203 via the client PC 10 or the smart device 30.

The document management part 204 uses the RAM 22, the HDD 24 and so forth and stores and manages files placed in the common folder 203. Further, the document management part 204 converts a file according to a request sent from the Web control part 208 and so forth.

The PC browser UI 205 displays a screen page for system settings according to a request by HTTP. A user can use a Web browser of the client PC 10 to change the settings. Further, the user can use the PC browser UI 205 and is allowed to send, to the file server 20, a request for generating a QR code for device registration (described later), and so forth. Further, the PC browser UI 205 displays a QR code for device registration on the display unit of the client PC 10. That is, the PC browser UI 205 is one example of a reception part and also is one example of a display control part.

The MFP UI 206 responds to a request by HTTP and displays a screen page of a QR code for printing or projection, a screen page for printing operation, a screen page for scanning operation and so forth. A user uses the MFP UI 206 and a browser function of the MFP 50, prints data received from the file server 20 through the MFP 50, uploads data read through scanning to the file server 20, and so forth.

The Web API 207 receives a request by HTTP from the smart device 30 or the like, carries out a process according to the request and responds to the request. Further, the Web API 207 generates various sorts of QR codes. Thus, the Web API 207 is one example of a receiving part.

The Web control part 208 controls respective operations of the PC browser UI 205, the MFP UI 206, the Web API 207 and the document management part 204.

The authentication management part 209 determines whether a request received by the Web API 207 is a request from a valid user. Further, the authentication management part 209 also authenticates a one-time key described later, carries out device registration, and so forth. Thus, the authentication management part 209 is one example of a determination part.

The setting information management part 210 manages device information and user settings.

The authentication management part 209 and the setting information management part 210 use the RAM 22, the HDD 24, and so forth, and manage various sorts of information.

Next, using FIG. 5, an example of a functional block configuration of the smart device 30 will be described.

Figure 5:
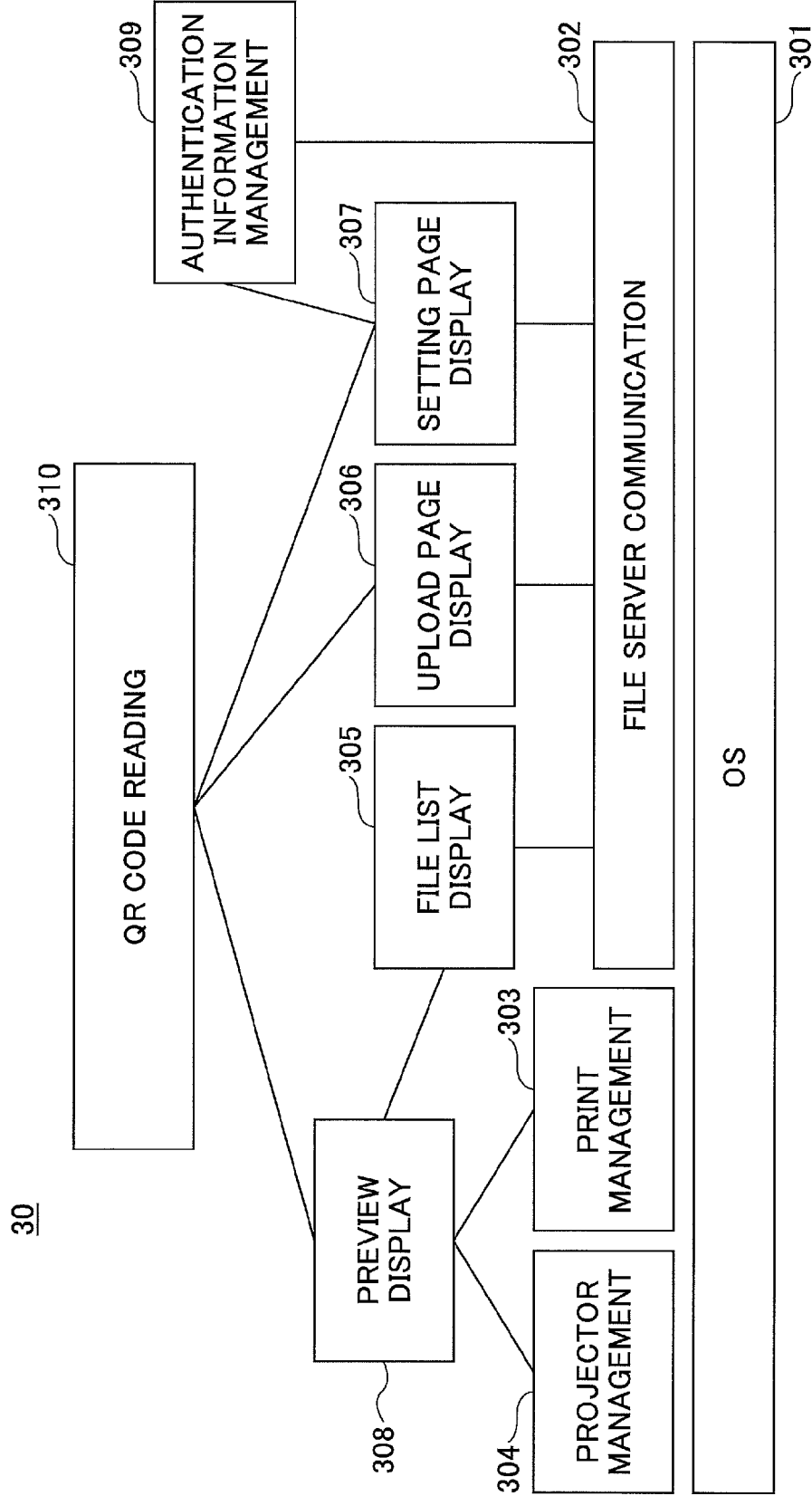
FIG. 5 is a block diagram illustrating one example of a functional configuration of the smart device.

As shown in FIG. 5, the smart device 30 includes an OS 301, a file server communication part 302, a print management part 303, a projector management part 304, a file list display part 305, an upload page display part 306, a setting page display part 307 and a preview display part 308. The smart device 30 further has an authentication information management part 309 and a QR code reading part 310.

The OS 301 is an operating system of the smart device 30 and controls the entire system of the smart device 30. For example, the OS 301 is iOS, Android, WindowsPhone, BlackBerry or the like.

The file server communication part 302 transmits information to and receives information from the Web API 207 of the file server 20 by HTTP. When thus carrying out transmission/reception, authentication information for service request managed by the authentication information management part 309 is attached to the HTTP information. The file list display part 305, the upload page display part 306 and the setting page display part 307, described later, use the file server communication part 302, obtain information from the file server 20 or request processes from the file server 20. Thus, the file server communication part 302 is one example of a service request transmission part.

The authentication information management part 309 uses the RAM 32 and manages authentication information for service request.

The print management part 303 carries out processes of searching for and/or registering the MFP 50, and transmitting a selected file to MFP 50 to print the file.

The projector management part 304 carries out processes of searching for and/or registering the projector 60, and projecting a selected file through the projector 60. Thus, the projector 60 is one example of a projection data generation part.

The file list display part 305 displays a screen page showing a list of files stored in the file server 20 and displays a screen page created by the preview display part 308 described later in response to a user's selecting a file from the list.

The upload page display part 306 displays a menu for uploading a file to the file server 20 and uploads the file to the file server 20. As a specific method of uploading, the following methods can be used. That is, when a QR code for uploading displayed on a display unit of the MFP 50 is read by the camera module 35 of the smart device 30, a document or the like is scanned by the MFP 50a and the document or the like is uploaded to the file server 20. Note that in the QR code for uploading, necessary data for uploading, such as the IP address of the file server 20 to which the document or the like is uploaded, is embedded. It is also possible to upload data stored in the smart device 30 or data photographed by the camera module 35 of the smart device 30.

The setting page display part 307 displays a screen page that is to be displayed when the file server 20 is requested to carry out device registration, a screen page showing setting information in the smart device 30, and so forth.

The preview display part 308 displays a preview of a file selected by a user from the above-mentioned screen page showing a list of files. Further, the preview display part 308 displays a menu for projecting an image by the projector 60 or a menu for printing.

The file list display part 305, the upload page display part 306, the setting page display part 307 and the preview display part 308 use the display unit 36 to display information.

The QR code reading part 310 is used when QR codes are read concerning the respective functions of the preview display part 308, the upload page display part 306 and the setting page display part 307. Note that the QR codes thus being read include a "QR code for device registration" for registering the smart device 30 with the file server 20; a "QR code for printing and uploading" for printing and scanning by the MFP 50; a "QR code for projection" for projection by the projector 60. The QR code reading part 310 uses the camera module 35 and reads (photographs) the QR codes. That is, the QR code reading part 310 is one example of an authentication information obtaining part.

Note that the smart device 30 can be implemented by using a common smartphone, tablet terminal or the like and embedding a predetermined application program described later in the ROM 33. In this case, the respective functional parts shown in FIG. 5 other than the OS 301 are implemented as a result of the predetermined application program being executed by the CPU 31. In this regard, the other various functional parts that a common smartphone, tablet terminal or the like inherently has are omitted in FIG. 5.

Note that the respective hardware configurations and the respective functional configurations of the client PC 10, the relay server 40, the MFP 50 and the projector 60 can be the same as those of common PC, relay server, MFP and projector, respectively.

Next, using FIG. 6, a flow of processes when a user registers the smart device 30, i.e., carries out "device registration", with the file server 20 in the information processing system shown in FIG. 1 will be described.

In step S1 and S1.1, a user accesses the file server 20 via the client PC 10. In response thereto, the authentication management part 209 in the file server 20 displays a login screen page on the display unit of the client PC 10. In response thereto, the user inputs his or her own account information (a user name and a password) and requests login (steps S2, S2.1). In response thereto, the authentication management part 209 in the file server 20 notifies the user of an "authentication result".

When the "authentication result" is a "successful authentication", the user sends a request for generating a QR code for device registration (steps S3, S3.1). In response to the request, the Web API 207 in the file server 20 generates a QR code for device registration (step S3.1.1), and the PC browser UI 205 displays the QR code for device registration on the display unit of the client PC 10. Therefore, the Web API 207 is one example of an authentication information image generation part and the PC browser UI 205 is one example of a display control part.

After the user sees the displayed QR code, the user operates the smart device 30 to start the above-mentioned predetermined application program installed in the ROM 33 of the smart device 30 (step S4). As a result, the respective functions of the above-mentioned file server communication part 302, print management part 303, projector management part 304, file list display part 305, upload page display part 306 and setting page display part 307 become usable. Further, the respective functions of the above-mentioned preview display part 308, authentication information management part 309 and QR code reading part 310 become usable.

Then, the user holds the camera module 35 of the smart device 30 over the display unit of the client PC 10. As a result, the QR code reading part 310 in the smart device 30 reads the QR code for devise registration displayed on the display unit of the client PC 10 (step S4.1). Therefore, the QR code reading part 310 is one example of an authentication information obtaining part.

The setting page display part 307 uses "information necessary for authentication" embedded in the read QR code for device registration and creates a "device registration request" and the file server communication part 302 sends the device registration request (step S4.2 "device registration request"). Thus, the file server communication part 302 is one example of an authentication information transmission part.

The authentication management part 209 in the file server 20 receives the device registration request and authenticates a one-time key (step S4.2.1). The one-time key (described later) is included in the "information necessary for authentication" embedded in the QR code for device registration.

In the authentication of the one-time key (step S4.2.1), the authentication management part 209 determines whether the same one-time key as the one-time key embedded in the QR code for device registration generated in step S3.1.1 is included in the device registration request.

When the same one-time key as that embedded in the QR code for device registration is included in the device registration request, the authentication management part 209 obtains an authentication result "successful authentication".

On the other hand, when the same one-time key as that embedded in the QR code for device registration is not included in the device registration request, the authentication management part 209 obtains an authentication result "authentication failure".

In the case of "authentication failure", the authentication management part 209 notifies the smart device 30 of a "device registration error" message (step S4.2.2).

On the other hand, in the case of "successful authentication", the authentication management part 209 in the file server 20 uses a database 220 inside the file server 20 and carries out "device registration" (step S4.2.3 "register device information"). That is, the authentication management part 209 and the database 220 are one example of a second storage part.

In "device registration" in step S4.2.3, the device ID of the smart device 30 included in the device registration request in step S4.2 by the setting page display part 307 and the user's account information that is input by the user in step S2 are registered in a manner of being associated with one another. The device ID is one example of device identification information.

After the "device registration", the authentication management part 209 notifies the smart device 30 of the user's account information (user name and password) used in the registration. The user's account information is one example of information concerning a user.

After "device registration" is thus carried out in the file server 20, the user is allowed to access files stored in the file server by using the thus-registered smart device 30.

That is, the user operates the smart device 30 for accessing a file stored in the file server 20 (step S5). As a result, for example, the file list display part 305 uses the file server communication part 302 and sends a file access request (authentication request) to the file server 20 (step S5.1). Therefore, the file list display part 305 and file server communication part 302 are one example of a service request transmission part.

In response to the file access request in step S5.1, the authentication management part 209 determines whether information coincide with the device ID included in the file access request is managed in the database 220 (step S5.1.1 "authenticate device").

When information coincide with the device ID included in the file access request is managed in the database 220, the authentication management part 209 obtains an authentication result "successful device authentication".

On the other hand, when information coincides with the device ID included in the file access request is not managed in the database 220, the authentication management part 209 obtains an authentication result "device authentication failure".

The authentication management part 209 updates the term of validity of the corresponding device registration ("device usable period") (step S5.1.2) in the case of "successful device authentication".

Next, the authentication management part 209 determines whether information coincide with the user's account information included in the file access request in step S5.1 is managed in the database 220 (step S5.1.3 "authenticate user").

When information coincide with the user's account information included in the file access request is managed in the database 220, the authentication management part 209 obtains an authentication result "successful user authentication".

On the other hand, when information coincides with the user's account information included in the file access request is not managed in the database 220, the authentication management part 209 obtains an authentication result "user authentication failure". Thus, the authentication management part 209 is one example of a determination part.

In the case of "successful user authentication", information of a list of files in the common folder 203 is transmitted to the smart device 30. In response thereto, the file list display part 305 in the smart device 30 displays the list of files on the display unit 36. Thus, the common folder 203 is one example of a service providing part.

Thus, in the QR code for device registration read from the client PC 10 by the smart device in step S4.1, the "information necessary for authentication" is embedded. The smart device 30 creates the "device registration request" including the "information necessary for authentication" and transmits it to the file server 20 (step S4.2).

When the "information necessary for authentication" included in the "device registration request" is valid, the file server 20 carries out the following process. That is, the user who logs in and the smart device 30 which is the transmission source of the "device registration request" are registered in the database 220 of the file server 20 in a manner of being associated with one another (step S4.2.3 "register device information").

That is, according to the embodiment, using a "one-time key" that is embedded in a QR code for device registration and is notified to a "user who logs in" from the file server 20, the user transmits a "device registration request". When the "one-time key" notified to the "user who logs in" is included in the "device registration request", the file server 20 determines that the "device registration request" is one transmitted from the "user who logs in". Then, the file server 20 carries out "device registration" in such a manner of associating the "device ID" included in the "device registration request" with the account information of the "user who logs in".

Thus, the file server 20 uses a "one-time key" to determine that the "user who logs in" is the user of the smart device 30 having "the device ID" and carries out "device registration" in a manner of associating the device registration with the user's account information. Thereafter, in response to an access request sent from the "smart device 30" that has the "device ID" using the "account information" of the above-mentioned "associated user", the file server 30 allows access.

Therefore, the file server 20 denies access (i.e., authentication failure, the same manner being applied hereinafter) in response to an access request using only the user's account information without including the associated "the device ID". Thus, even when the user's account information is inadvertently disclosed, it is possible to prevent access to the file server 20 using only the inadvertently disclosed user's account information.

Note that in the above-mentioned explanation, the file server 20 determines that the "user who logs in" is the user of the "smart device 30" that has the "device ID" by using the "one-time key". However, a device for determining that the "user who logs in" is the user of the "smart device 30" that has the "device ID" is not limited to a "one-time key". It is also possible to determine that the "user who logs in" is the user of the "smart device 30" that has the "device ID" by using another authentication device.

Next, using FIG. 7, a procedure in which the file server 20 issues a QR code for device registration according to the present embodiment will be described.

Figure 7:
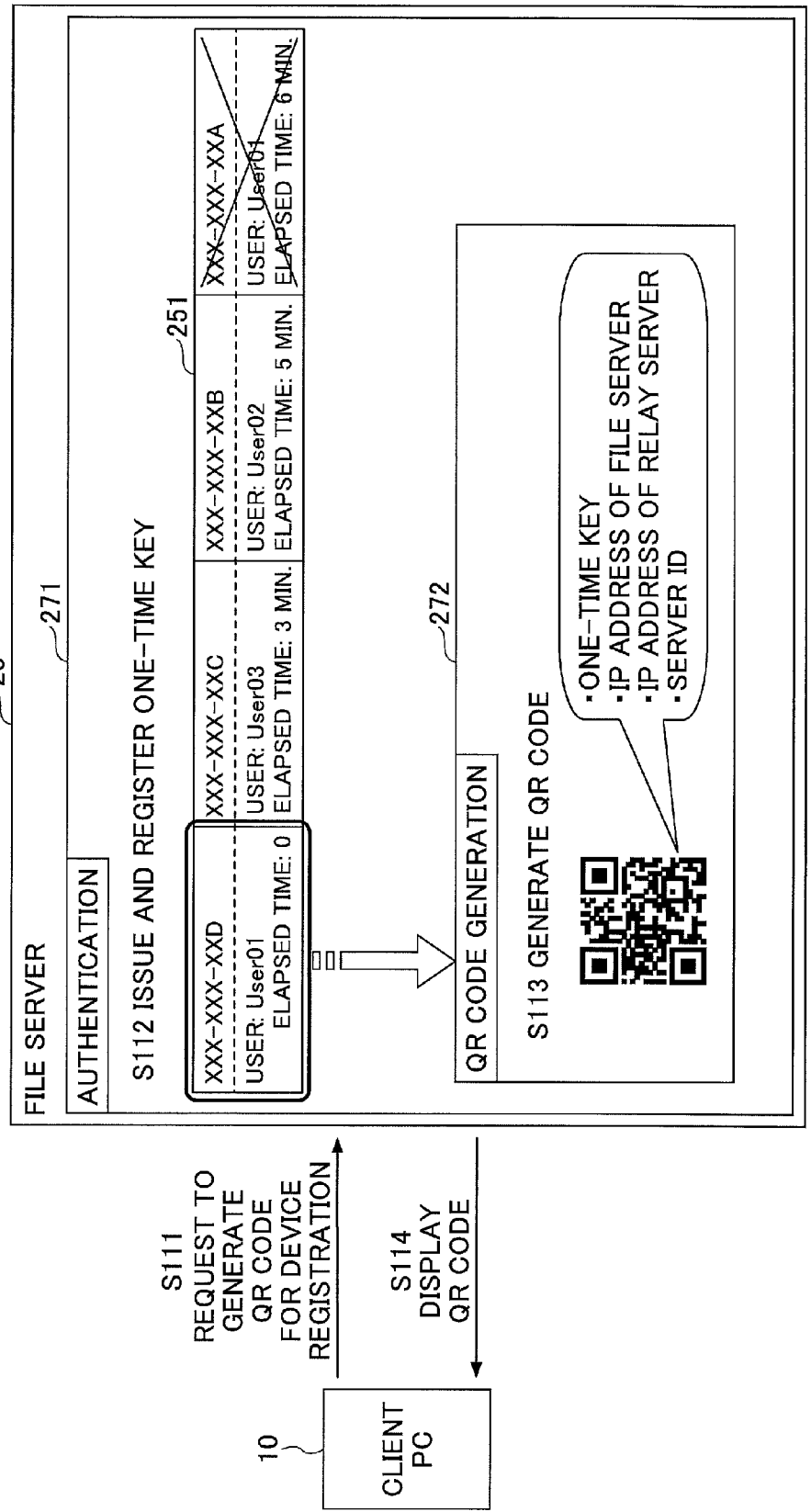
FIG. 7 illustrates a flow of processes at a time of QR code issuance in the information processing system shown in FIG. 1.

As shown in FIG. 7, when a user uses the client PC 10 and sends a QR code generating request ("requests to generate a QR code for device registration") (step S111), the authentication part 271 in the file server 20 carries out the following processes. That is, the authentication part 271 issues a "one-time key" and stores it in a memory (for example, the RAM 22) until a time of device registration in a form of a map 251 (step S112). Note that the QR code generating request is one example of a request for generating authentication information for device registration. That is, the authentication part 271 is one example of a first storage part.

The thus issued one-time key is transmitted to a QR code generation part 272. The QR code generation part 272 uses the one-time key and issues a QR code for device registration (step S113).

The issued QR code for device registration is transmitted to the client PC 10 and is displayed on the display unit of the client PC (step S115).

Note that the function of the above-mentioned "authentication part 271" is implemented by the authentication management part 209 and the setting information management part 210, and the function of the "QR code generation part 272" is implemented by the Web API 207. That is, also the setting information management part 210 is one example of the first storage part and each of the QR code generation part 272 and the WebAPI 207 is one example of an authentication information image generation part.

In FIG. 7, each of "one-time keys" stored in the map 251 is expressed by, for example, "XXX-XXX-XXD", for example, and as shown, is managed together with a corresponding user name ("User01", for example) and an "elapsed time" that is a time elapsing from the issuance of the corresponding one-time key.

Further, as will be described later, when a one-time key is generated a plurality of times for a single user, the authentication part 271 deletes the older one-time key in sequence and registers only the latest one-time key.

In FIG. 7, the rightmost one-time key "XXX-XXX-XXA" in the map 251 is deleted (a mark "X" is given) because a new one-time key "XXX-XXX-XXD" is generated for the same user "User01".

Further, as shown in FIG. 7, in the QR code for device registration, respective sorts of information are embedded such as a "one-time key", an "IP address of file server" (20), an "IP address of relay server" (40) and a "server ID" of the file server 20.

Among these items, the "server ID" and the "IP address of relay server" are required when the smart device 30 is connected to the file server 20 via the relay server 40. Therefore, when the smart device 30 does not use the relay server 40 and is directly connected to the file server 20, these items are not necessary.

Next, using FIG. 8, a flow of processes for issuing a one-time key (step S112 in FIG. 7) will be described.

After receiving the QR code generating request (step S111 in FIG. 7), the authentication part 271 issues a random Universally Unique ID (UUID) as a one-time key in step S201. Then, the thus issued one-time key is registered in the map 251 in which one-time keys issued until then are managed (see FIG. 7).

Only single one-time key is allowed to be issued for a single user. Therefore, when an existing one-time key is already present for the same user, the existing one is deleted and the latest one is registered.

Further, for each of registered one-time keys, the "elapsed time" is stored as a time elapsing from the issuance of the corresponding one-time key (see FIG. 7) and the "elapsed times" are used to manage the terms of validity of QR codes for device registration (described later using FIG. 15).

That is, after issuing a one-time key in step S201, the authentication part 271 determines whether a one-time key is already registered for the same user (step S202).

When a one-time key is already registered for the same user (YES at step S202), the authentication part 271 deletes the already registered one-time key (step S203).

On the other hand, when no one-time key is already registered for the same user (NO at step S202), the authentication part 271 starts measurement of time (step S204), registers the one-time key issued in step S201 (step S205) and proceeds to step S206.

In step S206, the authentication part 271 sends the one-time key issued in step S201 to the QR code generation part 272 and finishes the process.

Figure 9A:
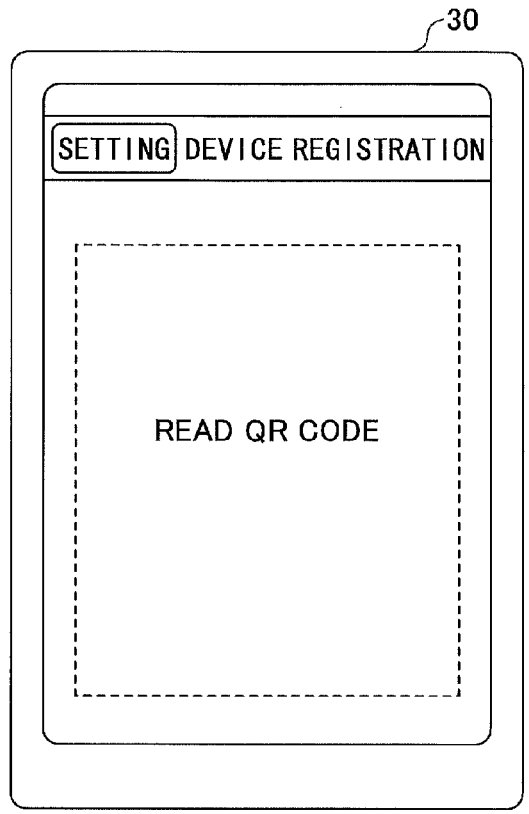
FIG. 9A shows an example of displaying a QR code reading page in the smart device shown in FIG. 1.
Figure 9B:
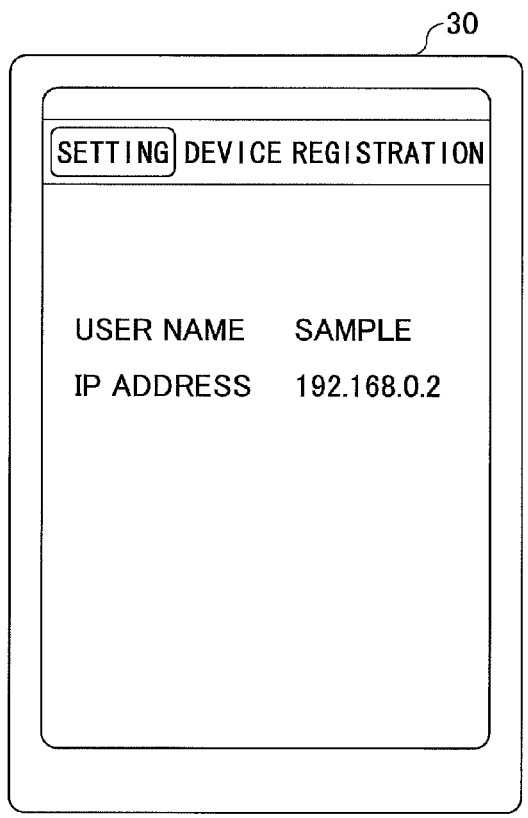
FIG. 9B shows an example of displaying a registration completion page in the smart device shown in FIG. 1.

Next, using FIGS. 9A and 9B, a screen page (FIG. 9A) on the display unit 36 in the smart device 30 to read a QR code for device registration and a screen page (FIG. 9B) on the display unit 36 in the smart device 30 displayed when the file server 20 completes device registration.

Figure 6:
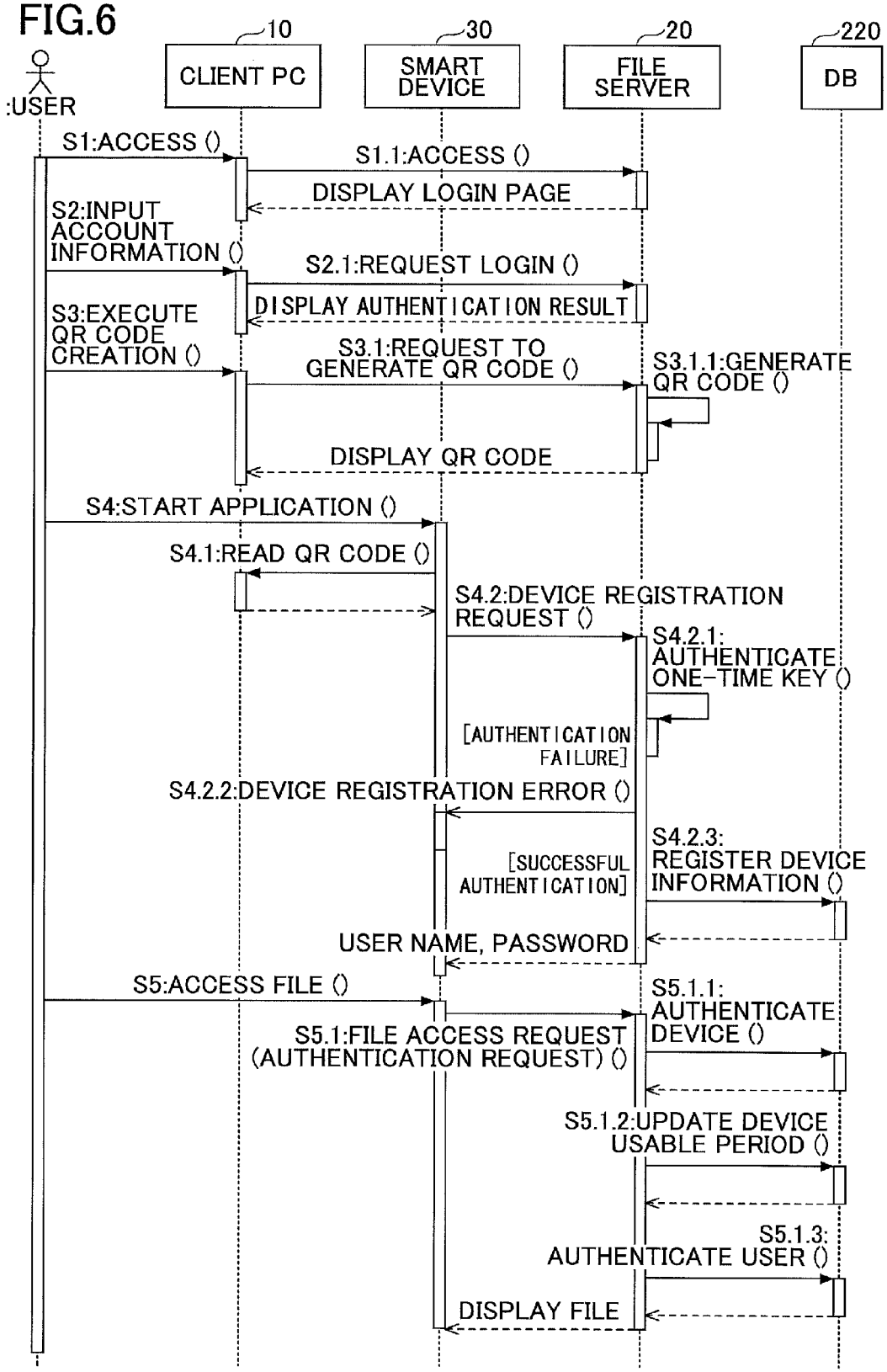
FIG. 6 is a sequence diagram illustrating a flow of processes at a time of device registration in an information processing system shown in FIG. 1.

When a QR code for device registration displayed on the display unit of the client PC 10 is to be read in step S4.1 of FIG. 6 using the camera module 35, the setting page display part 307 displays a screen page such as that shown in FIG. 9A under the control of the QR code reading part 310.

Further, when the file server 20 succeeds in "device registration" of the smart device 30, the setting page display part 307 displays information concerning the file server 20 (IP address) with which the registration is made and a user name of the registered user.

Next, using FIG. 10, an example of a screen page showing a QR code for device registration displayed on the display unit of the client PC 10 will be described.

Figures 10, 11:
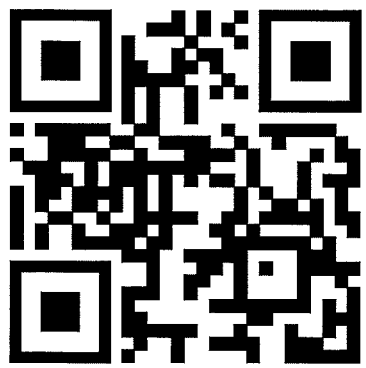
FIG. 10 shows an example of displaying a QR code for device registration on a screen of a client Personal Computer (PC) shown in FIG. 1.
FIG. 11 shows an example of the contents of QR code for device registration in the information processing system shown in FIG. 1.

As shown in FIG. 10, on the display unit of the client PC 10, the QR code for device registration generated by the QR code generation part 272 in step S113 of FIG. 7 is displayed (step S114 in FIG. 7).

The user presses a photographing switch (not shown) while holding the smart device 30 in such a manner that the QR code for device registration is present at a center of the screen page shown in FIG. 9A and thus reads (photographs) the QR code for device registration (step S4.1 in FIG. 6).

Next, using FIG. 11, the contents of information embedded in the QR code for device registration will be described.

In the example of FIG. 11, the server ID ("serverID") and the IP address ("IPAddress") of the file server 20 with which the registration is made; the IP address ("relayAddress") of the relay server 40; and the one-time key ("oneTimeKey") are embedded in the QR code for device registration.

Note that, as mentioned above, the "server ID" and "the IP address of the relay server" are required when the smart device 30 is connected with the file server 20 via the relay server 40. Therefore, when the smart device 30 is connected directly with the file server 20 without using the relay server 40, these items are not necessary.

Figure 12:
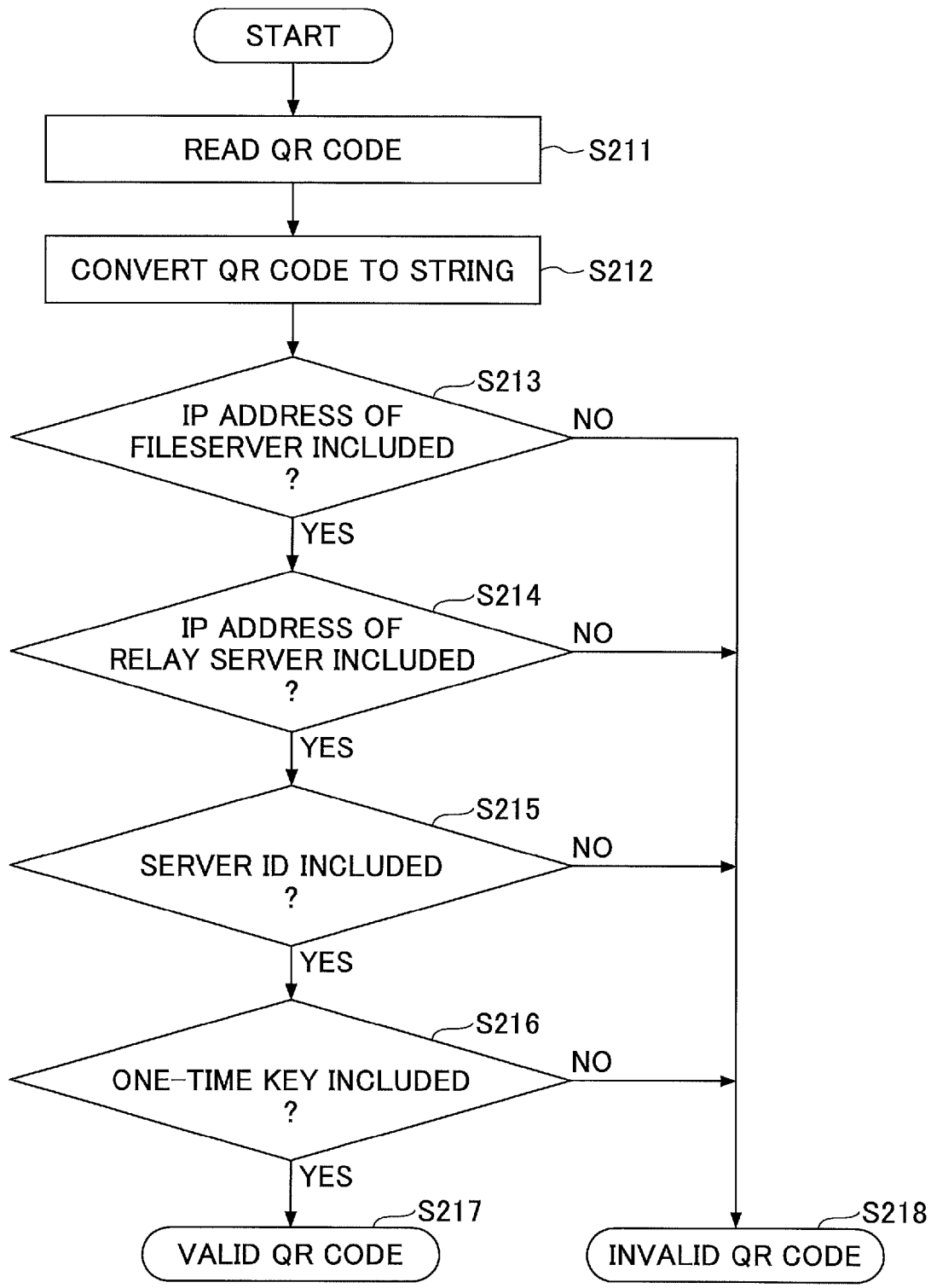
FIG. 12 is a flowchart illustrating a flow of processes of analyzing a QR code carried out by the smart device shown in FIG. 1.

Next, using FIG. 12, an example of a flow of processes of analyzing the QR code for device registration that is read by, for example, the screen page of FIG. 9A carried out by the setting page display part 307 of the smart device 30 will be described. Therefore, also the setting page display part 307 is one example of an authentication information obtaining part.

The setting page display part 307 reads a QR code for device registration in step S211 (step S4.1 in FIG. 6) and then, converts the read QR code for device registration into a character string (step S212).

Next, the setting page display part 307 determines whether the items of information to be embedded by the file server 20 (see FIG. 11) are included without excess or deficiency. Thus, the setting page display part 307 determines whether the read QR code for device registration is properly generated. If the read QR code is one generated by spoofing of a third party, the setting page display part 307 does not send a "device registration request" (step S4.2 in FIG. 6).

That is, the setting page display part 307 determines whether the information obtained from the QR code for device registration in step S212 includes an IP address of a file server 20 (step S213). Specifically, it is determined whether information having the corresponding item name "IPAddress", for example, shown in FIG. 11 is included.

When an IP address of a file server 20 is included (YES at step S213), the process proceeds to step S214. When no IP address of a file server 20 is included (NO at step S213), the process proceeds to step S218.

In step S218, the setting page display part 307 determines that the QR code read in step S211 is not a valid QR code. In this case, as mentioned above, the setting page display part 307 does not send a "device registration request".

In step S214, the setting page display part 307 determines whether the information obtained from the QR code for device registration in step S212 includes an IP address of a relay server 40. Specifically, it is determined whether information having the corresponding item name "relayAddress", for example, shown in FIG. 11 is included.

When an IP address of a relay server 40 is included (YES at step S214), the process proceeds to step S215. When no IP address of a relay server 40 is included (NO at step S214), the process proceeds to step S218.

In step S215, the setting page display part 307 determines whether the information obtained from the QR code for device registration in step S212 includes a server ID. Specifically, it is determined whether information having the corresponding item name "serverID", for example, shown in FIG. 11 is included.

When a server ID is included (YES at step S215), the process proceeds to step S216. When no server ID is included (NO at step S215), the process proceeds to step S218.

In step S216, the setting page display part 307 determines whether the information obtained from the QR code for device registration in step S212 includes a one-time key. Specifically, it is determined whether information having the corresponding item name "oneTimeKey", for example, shown in FIG. 11 is included.

When a one-time key is included (YES at step S216), the process proceeds to step S217. When no one-time key is included (NO at step S216), the process proceeds to step S218.

In step S217, the setting page display part 307 determines that the read QR code is a valid QR code for device registration, and sends a "device registration request" using the same QR code by the file server communication part 302 (step S4.2 "device registration request" in FIG. 6).

Note that as mentioned above, the "server ID" and "the IP address of the relay server" are required when the smart device 30 is connected with the file server 20 via the relay server 40. Therefore, when the smart device 30 is connected directly with the file server 20 without using the relay server 40, these items are not necessary. Therefore, when the smart device 30 does not use the relay server 40 and is directly connected to the file server 20, steps S214 and S215 are unnecessary and are skipped over.

Next, using FIG. 13, an example of the contents included in a "device registration request" transmitted from the smart device 30 to the file server 20 in step S4.2 of FIG. 6 will be described.

In the example of FIG. 13, a device registration request includes a one-time key ("oneTimeKey"), a device name ("deviceName"), a type ("deviceType") and a device ID ("UUID").

Among these items, the one-time key is a one-time key embedded in a QR code for device registration that is read in step S4.1 of FIG. 6.

The other items, i.e., the device name, the type and the device ID are the device name, the type and the device ID of the smart device 30. Thereamong, as the device name and the type, it is possible to use, for example, the corresponding items of information that the smart device 30 itself has. The device ID is, for example, a UUID generated by the setting page display part 307.

Next, using FIG. 14, an example of a flow of data at a time of "device registration" will be described.

When the smart device 30 reads a QR code for device registration from the screen (display unit) of the client PC 10 (step S4.1 in FIG. 6), the smart device 30 transmits a device registration request to the file server 20 (step S101). The device registration request includes, as mentioned above using FIG. 13, "device information" and the one-time key included in the QR code for device registration. Note that the "device information" includes the above-mentioned items, i.e., the device name, the type and the device ID.

The authentication part 271 in the file server 20 receives the device registration request and authenticates the one-time key (step S102, step S4.2.1 in FIG. 6). When the authentication succeeds, the "device information" is registered in the database 220 (step S103).

Figure 14:
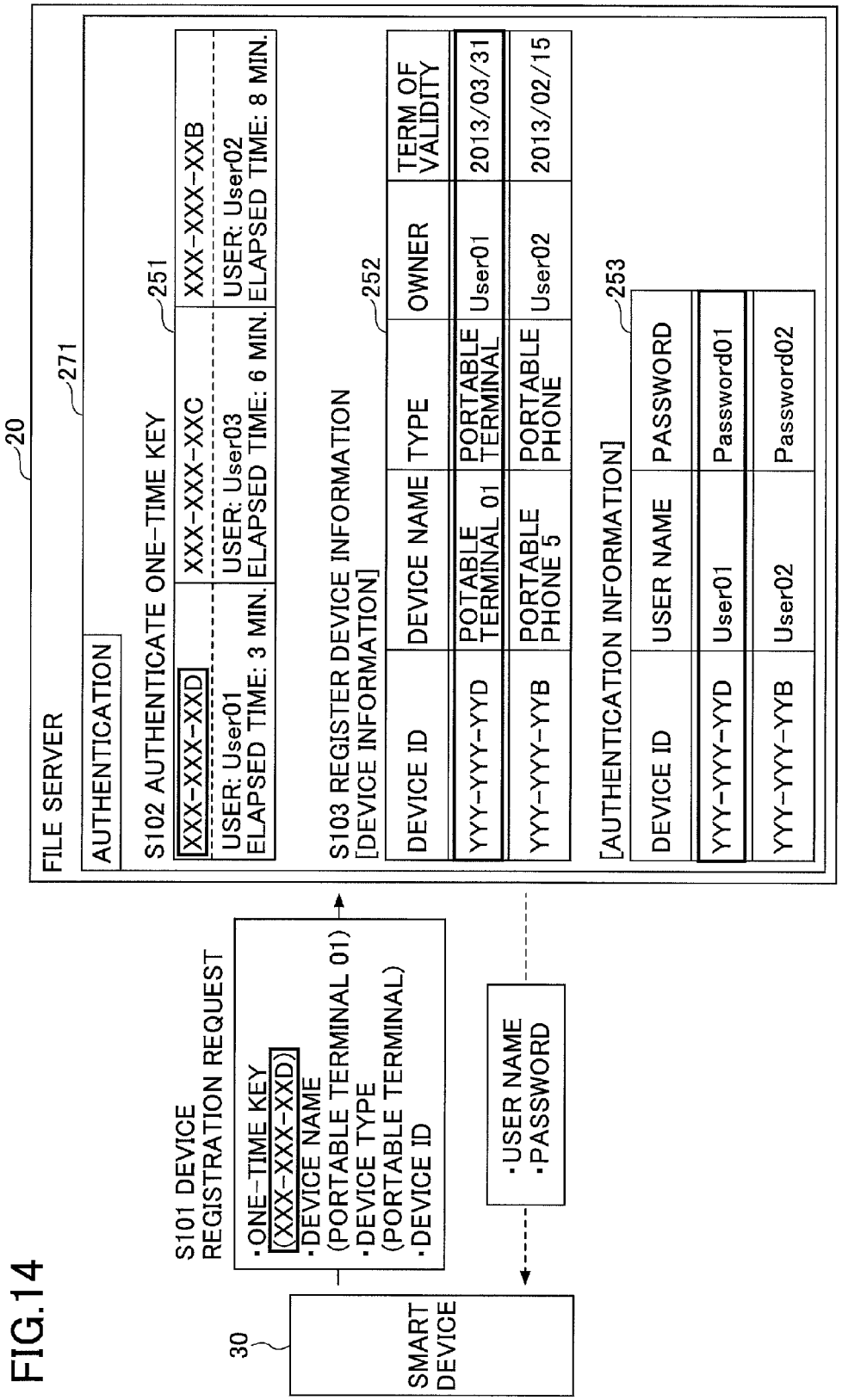
FIG. 14 illustrates an example of a flow of processes at a time of device registration in the information processing system shown in FIG. 1.

As the "device information" 252 registered in the database 220, according to the present embodiment, as shown in FIG. 14, in addition to the above-mentioned items of the device ID, the device name and the type, a "user name" and a "term of validity" (described later using FIG. 15) are registered for the purpose of management. Note that the above-mentioned items of the "device name" and the "type" are also registration information for the purpose of management.

Also, as authentication information for service request 253 registered in the database 220, the user's account information is registered in association with the above-mentioned device ID. That is, the user name and the password of the user who is the owner of the smart device 30 that has the device ID are registered.

The device information 252 and the authentication information for service request 253 are associated with one another by the device ID. For example, in the example of FIG. 14, as shown, in association with the device ID "YYY-YYY-YYD", the device name "portable terminal 01", the type "portable terminal", the owner "User01" and the term of validity "2013/03/31" are managed (device information 252). Further, also in association with the same device ID "YYY-YYY-YYD", the user name "User01" and the password "Password01" are managed (authentication information for service request 253).

As shown in FIG. 14, the device ID and the user's account information are managed in the one-to-one correspondence relationship therebetween. Therefore, even when the user's account information is inadvertently disclosed and the inadvertently disclosed user's account information is used by a third party, the third party cannot access the file server 20. That is, the third party tries to access the file server 20 using another device that is not registered with the file server 20. Therefore, it is not possible to access the file server 20 consequently. Therefore, even when the user's account information is inadvertently disclosed, it is possible to prevent access to the file server 20.

Next, using FIG. 15, one example of a flow of operations of authenticating a one-time key (step S102 in FIG. 14, step S4.2.1 in FIG. 6) will be described.

The authentication part 271 first determines whether the same one-time key as that included in a device registration request (step S101 in FIG. 14) is included in already issued one-time keys managed in the map 251 (step S231).

When the same one-time key is found out (YES at step S231), the one-time key is deleted from the map 251 (step S234) and the authentication part 271 proceeds to step S235. Thus, once a one-time key is used for authentication, the one-time key is discarded. Thus, the same one-time key cannot be authenticated again.

On the other hand, when the same one-time key does not exist (NO at step S231), the authentication part 271 proceeds to step S232.

In step S232, the authentication part 271 notifies the smart device 30 of an error (token invalidity error) message.

In step S235, the authentication part 271 determines whether the one-time key is valid with regard to the term of validity. A one-time key becomes invalid after a predetermined period of time elapses from the issuance and thus cannot be used for device registration.

When the one-time key is valid with regard to the term of validity (i.e., the term of validity has not expired) (YES at step S235), the authentication part 271 proceeds to step S236.

When the one-time key is not valid with regard to the term of validity (i.e., the term of validity has already expired) (NO at step S235), the authentication part 271 proceeds to step S233.

In step S233, the authentication part 271 notifies the smart device 30 of an error (token's term of validity expiration error) message.

In step S236, the authentication part 271 uses the user name managed in the map 251 in association with the one-time key as a key and searches for the database 220 in the file server 20. Thus, the authentication part 271 obtains the corresponding user information (that is, "the user's account information" including the "user name and password").

This user is the user who requested to generate the QR code in step S111 in FIG. 7 (step S3.1 in FIG. 6) and is registered as the owner of the smart device 30 in assertion with the device information in the database 220 (step S237). That is, as described above using FIG. 14, the user's account information and the device information are assorted with one another and are registered by the authentication part 271 as the authentication information for service request 253 in the database 220. Thus, "device registration" is carried out.

Note that, at this time, when the same device information is already registered in the database 220, the owner of the corresponding device is updated. That is, the user's account information obtained in step S236 is associated with the device information and is used to overwrite the already registered device information.

After thus carrying out "device registration" in step S237, the authentication part 271 proceeds to step S238.

In step S238, the authentication part 271 transmits the user name and the password concerning the device registration to the smart device 30 and thus finishes the processes.

After the "device registration" is thus completed, it is possible to access the file server 20 with the device ID of the device and the account information of the user who is thus registered as the owner of the device.

That is, since, as shown in FIG. 14, device information and user's account information are registered on one-to-one basis, access to the file server 20 is not allowed even when either one thereof is abused.

That is, a case where either one of device information and user's account information is abused is a case where an abusing third party has only one of device information and user's account information. That is, the third party does not have the other one of the device information and the user's account information. Therefore, the third party cannot access the file server 20 (authentication failure).

Next, using FIG. 16, an example of the information transmitted to the smart device 30 from the file server 20 in step S238 mentioned above will be described.

In step S238, the authentication part 271 sends the login user name ("username") and the login password ("userPassword") that were used when the user logged in to the file server 20 by the client PC ("input account information" in step S2 in FIG. 6). Thus, the information is notified to the user via the smart device 30.

Figures 17, 18:
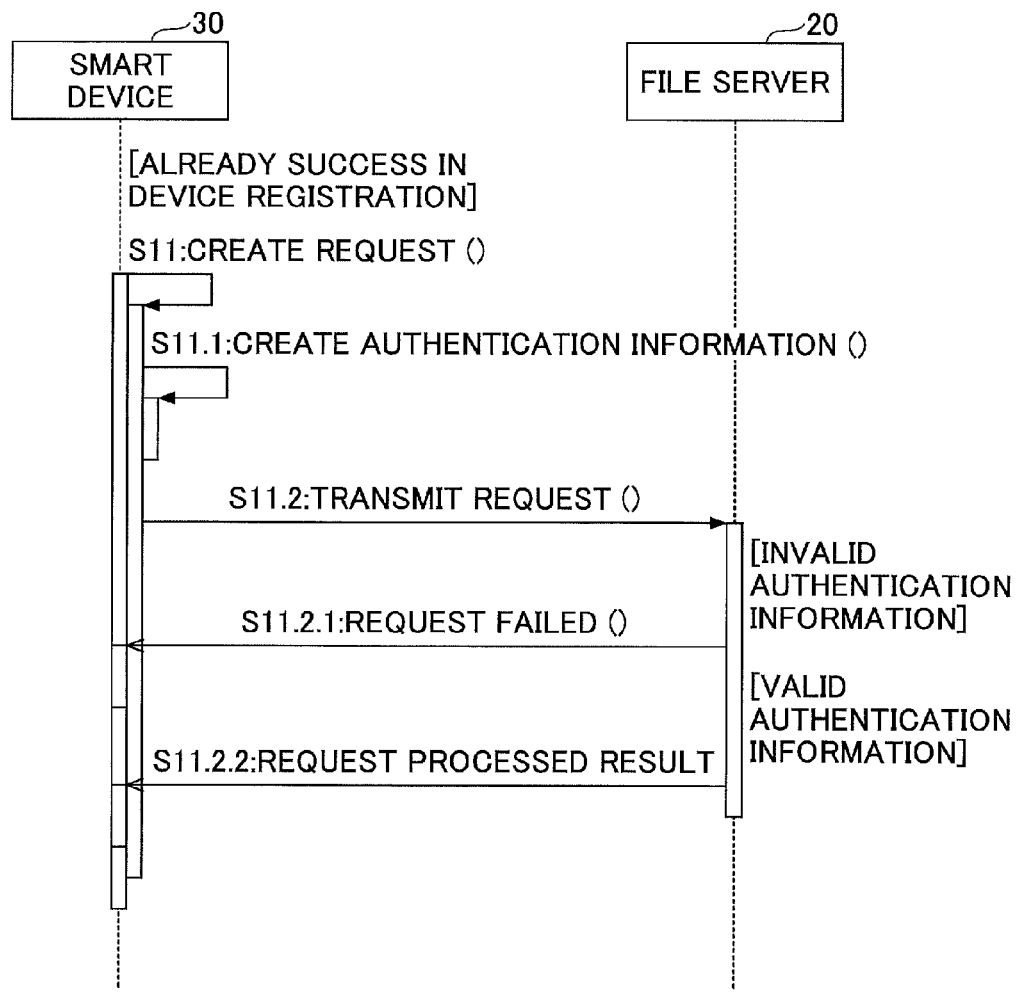
FIG. 17 is a sequence diagram illustrating a flow of processes of transmitting a request in the information processing system shown in FIG. 1.
FIG. 18 shows one example of authentication information for service request created by the smart device shown in FIG. 1.

Next, using FIG. 17, an example of a flow of processes carried out when the smart device 30 transmits a request (one example of a service use request) to the file server 20.

Note that transmission of a request from the smart device 30 is allowed after the completion of device registration of the smart device 30 with the file server 20.

That is, the setting page display part 307 in the smart device 30 determines that "device registration" is completed only after being notified of the user name and the password as a result of a series of processes being carried out for "device registration" in steps S1 to S4.2.3 of FIG. 6.

Therefore, when "authentication failure" occurs, for example, before "the user name and the password are notified by the file server 20", the user name and the password are not notified by the file server 20. In this case, the setting page display part 307 in the smart device 30 determines that "device registration" is not completed. As a result, even when the user performs operations for accessing a file in step S5 of FIG. 6 by the smart device 30, the setting page display part 307 does not accept the operations.

Returning to the description of FIG. 17, when "device registration" has been completed, the user can attach the authentication information for service request to each request for the file server 20 and transmit the request to the file server 20.

Note that the above-mentioned authentication information for service request is information included in the authentication information for service request 253 managed by the authentication part 271 of the file server 20. That is, the authentication information for service request is information including a device ID and user's account information (a user name and a password). Thus, a user name and a password are one example of information concerning a user and a device ID is one example of device identification information. Therefore, authentication information for service request is one example of information concerning a user and device identification information.

That is, when "device registration" of the smart device 30 with the file server 20 is completed, the smart device 30 creates a request (step S11). At this time, the smart device 30 creates authentication information for service request to be included in the request (step S11.1).

Next, the setting page display part 307 and so forth of the smart device 30 transmits the created request to the file server 20 (step S11.2). That is, the setting page display part 307 is one example of a service request transmission part.

The authentication part 271 in the file server 20 receives the request from the smart device 30 and carries out "authentication" using the authentication information for service request included in the request and obtains an authentication result. That is, also the authentication part 271 is one example of the determination part. Noted that the "authentication" corresponds to "authenticate device" (step S5.1.1 in FIG. 6), "update device use expiration data" (step S5.1.2), "authenticate user" (step S5.1.3) and so forth and is described later using FIG. 19.

When the authentication result is "authentication failure" (see FIG. 19), the authentication part 271 notifies the smart device 30 of "authentication failure" (step S11.2.1 "request failed") in response to the request.

On the other hand, when the authentication result is "successful authentication" (see FIG. 19), the authentication part 271 provides a service according to the request (step S11.2.2 "request processed result") in response to the request.

Figure 20:
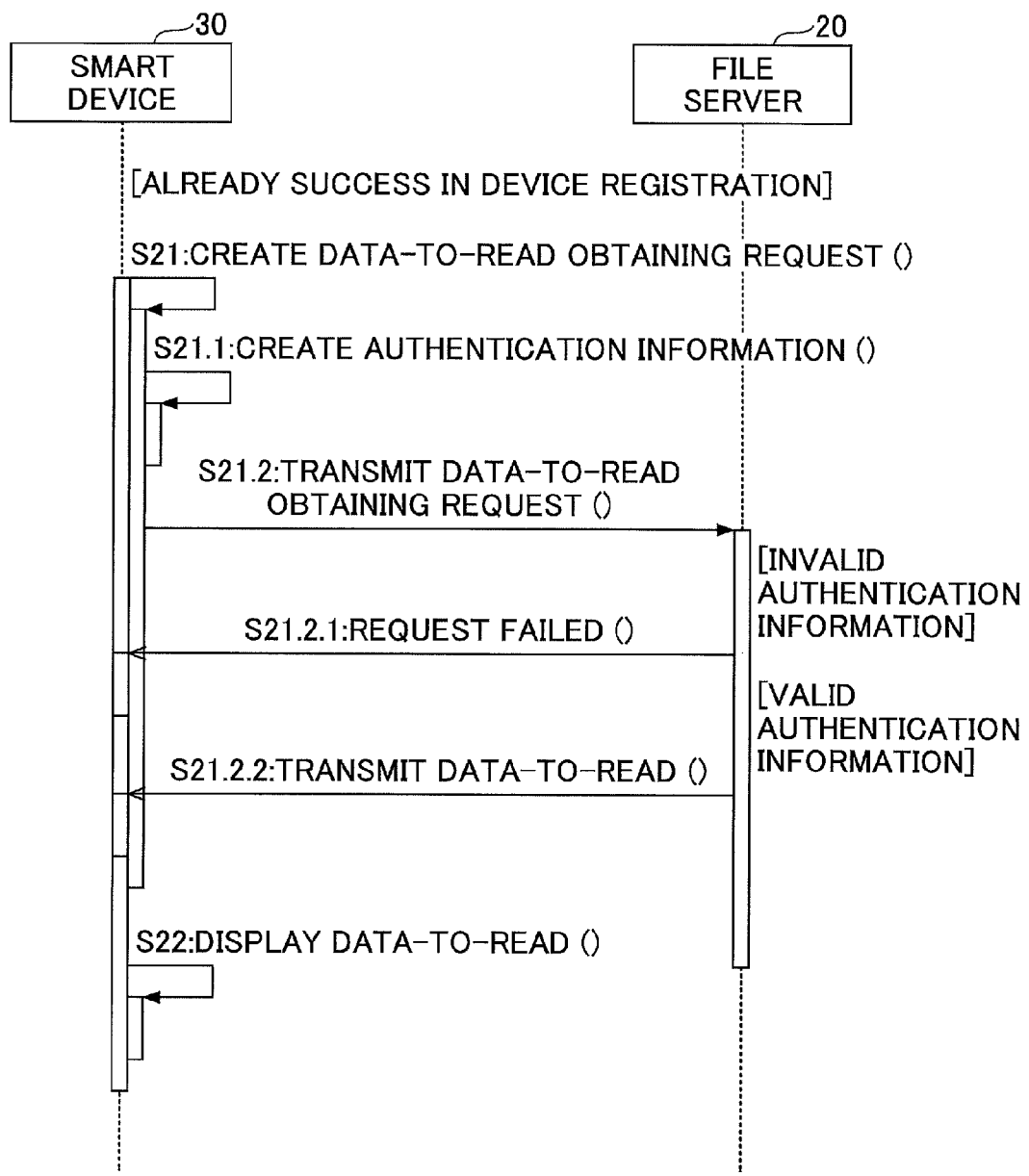
FIG. 20 is a sequence diagram illustrating a flow of processes for reading a file that the file server has by the smart device shown in FIG. 1.
Figure 21:
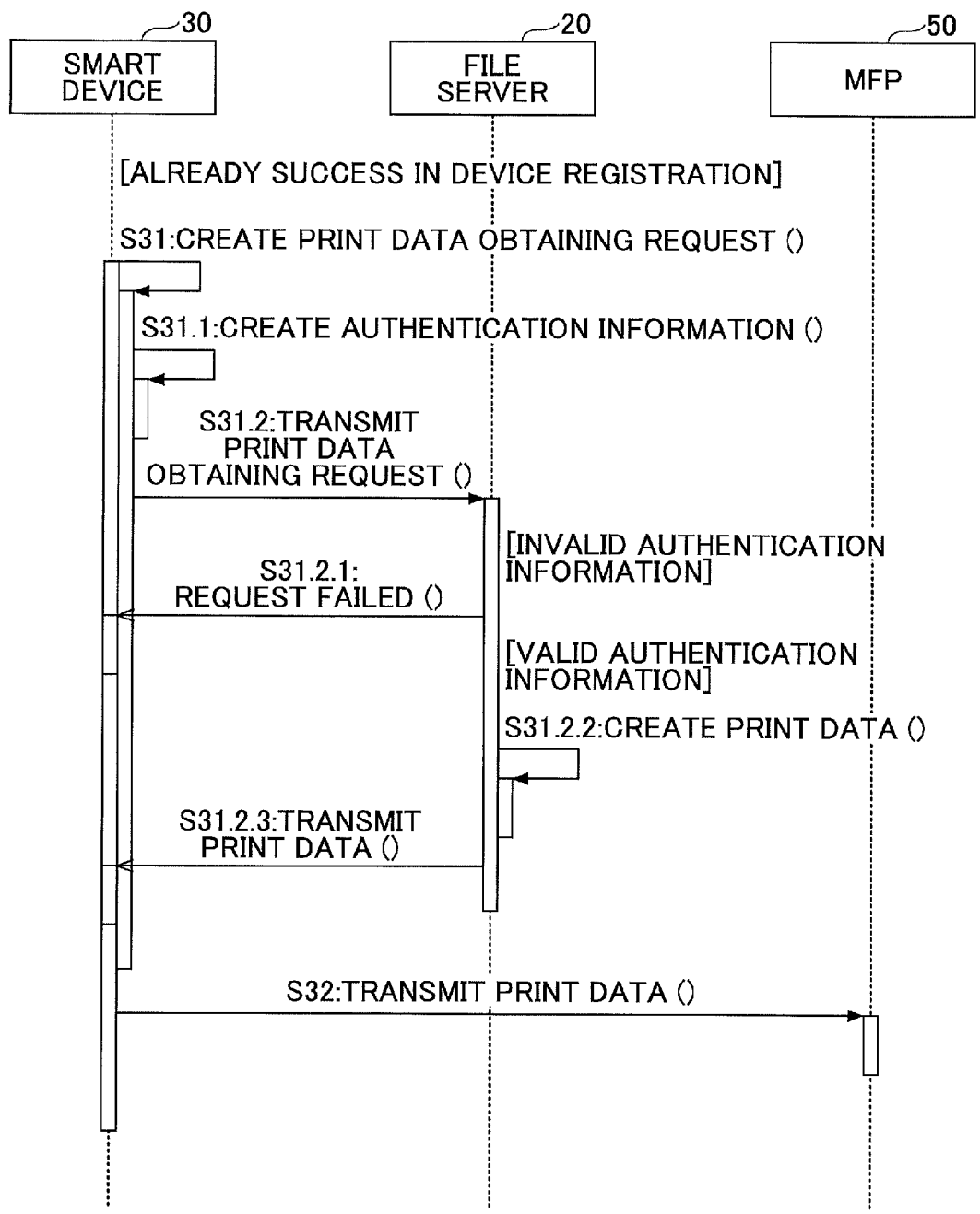
FIG. 21 is a sequence diagram illustrating a flow of processes for printing a file that the file server by the smart device shown in FIG. 1.
Figure 22:
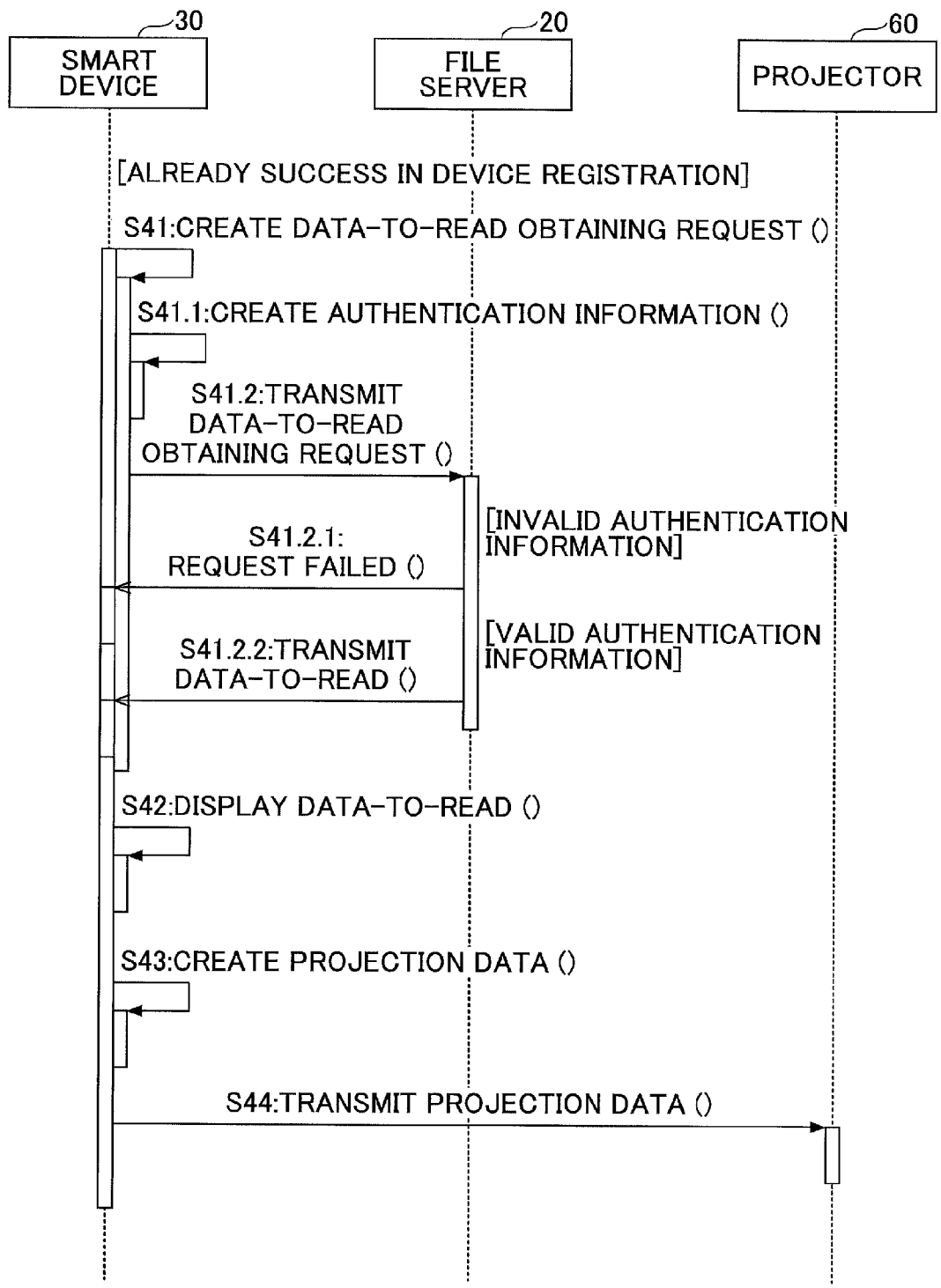
FIG. 22 is a sequence diagram illustrating a flow of processes for projecting a file that the file server has by the smart device shown in FIG. 1.

Specific examples of the above-mentioned service according to the request include "to read data stored in the file server 20" (FIG. 20); "to print data stored in the file server 20" (FIG. 21); and "to project data stored in the file server 20" (FIG. 22). Also, "upload data to the file server 20" is further included. Other examples of the above-mentioned service according to the request include not only to print data or to project data but also "to control scanning an image to obtain data", "to display data on a monitor", "to display data on an electronic blackboard (interactive whiteboard)", "to obtain data displayed on an electronic blackboard (interactive whiteboard)" and so forth.

Note that, although a method of transmitting print data or projection data to the MFP 50 or the projector 60 from the file server 20 via the smart device 30 has been described, embodiments are not limited thereto. For example, in FIG. 21, it is possible that print data is directly transmitted from the file server 20 to the MFP 50 which then prints the print data. Similarly, in FIG. 22, control can be carried out such that creation of projection data and transmission of the projection data are carried out by the file server 20 and the projector 60 projects the protection data.

Next, using FIG. 18, an example of the contents of information to be included in a request transmitted by the smart device in step S11.2 of FIG. 17 will be described.

As shown in FIG. 18, it is possible to include, in the information, a server ID ("serverID"), a "user name" ("testUser") and a "password" ("testUserPass") as user's account information ("Authorization") and a "device ID" ("AccessDevice"). Note that, among these items, a user name, a password and s device ID are authentication information for service request, as mentioned above.

Among these items, a server ID is identification information of the file server 20, and, as mentioned above, is information to be required when the smart device 30 is connected with the file server 20 via the relay server 40. Therefore, when the smart device 30 does not use the relay server 40 and is directly connected with the file server 20, these items are not necessary.

Figure 15:
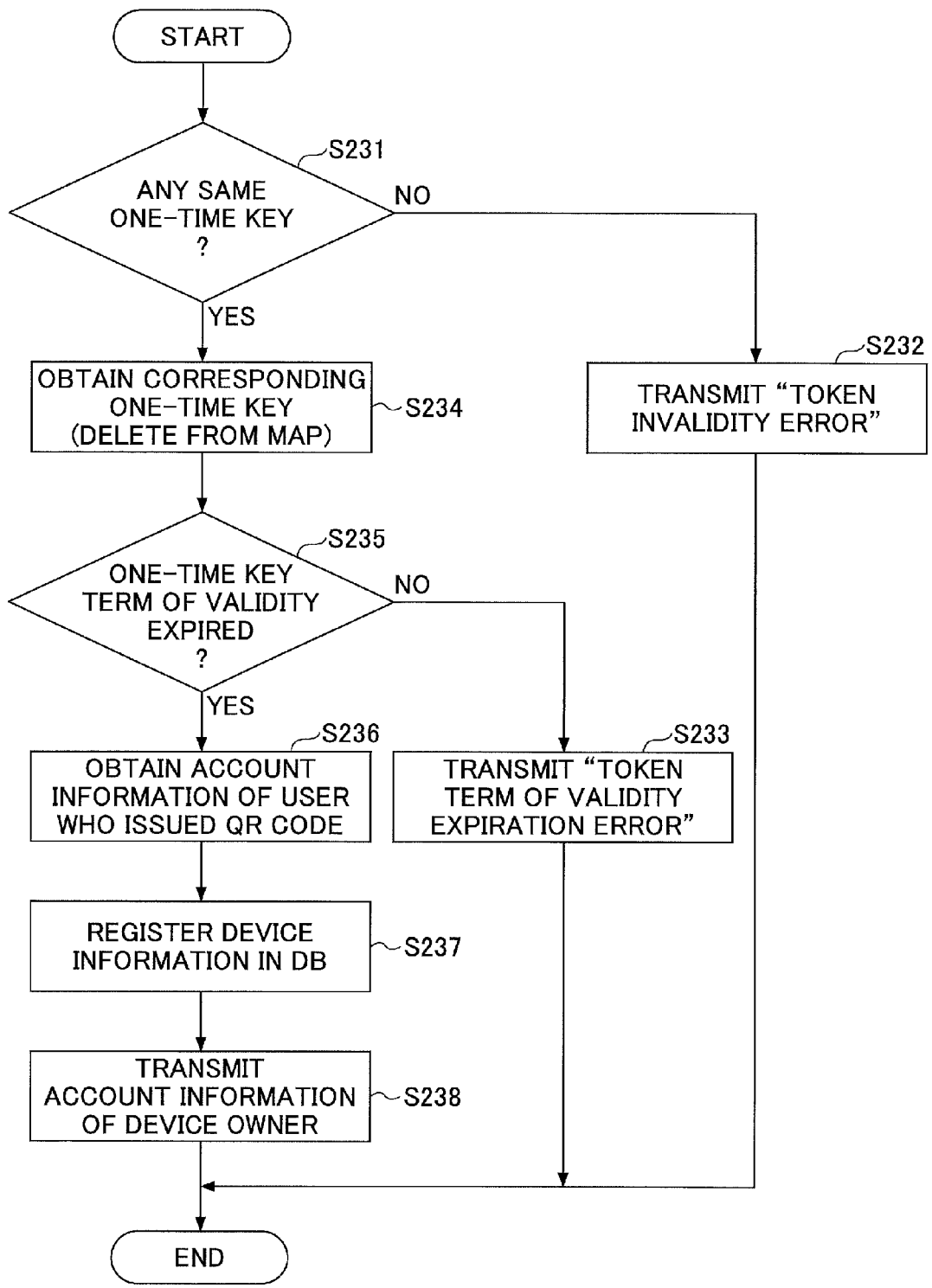
FIG. 15 is a flowchart illustrating a flow of processes of authenticating a one-time key carried out by the file server shown in FIG. 1.

Further, as a "user name" and a "password" as user's account information to be included in the request to be transmitted by the smart device 30 in step S11.2, user's account information obtained in step S236 of FIG. 15 is used. As a device ID, a device ID included in a device registration request that was sent to the file server 20 is used.

Next, using FIG. 19, an example of a flow of processes to authenticate the "request" mentioned above using FIG. 17 will be described.

The authentication part 271 in the file server 20 receives the request transmitted by the smart device 30 in step S11.2 of FIG. 17 (step S251) and obtains authentication information for service request ("authentication data") therefrom (step S252). The authentication information for service request includes, in this case, a "user name", a "password" and a "device ID" mentioned above using FIG. 18.

Then, the authentication part 271 determines whether the "device ID" included in the obtained authentication information for service request is registered in the authentication information for service request 253 shown in FIG. 14 (step S253).

When the determination result is that the device ID is registered in the authentication information for service request 253 (YES at step S253), the authentication part 271 proceeds to step S254.

When the determination result is that the device ID is not registered in the authentication information for service request 253 (NO at step S253), the authentication part 271 obtains the authentication result of "authentication failure".

In step S254, the authentication part 271 determines whether the usable period of time of the device corresponding to the device ID used in step S253 has expired.

Note that the authentication part 271 manages the usable period of time of the device for each of the device IDs registered as the device information 252. For example, such management is carried out that time measurement is started at a time of device registration and the usable period of time of the device is expired when one month elapses from the device registration.

When the determination result is that the "usable period of time has expired" (NO at step S254), the authentication part 271 obtains the authentication result of "authentication failure".

On the other hand, when the determination result is that the "usable period of time has not expired" (YES at step S254), the authentication part 271 proceeds to step S255.

In step S255, the authentication part 271 updates the usable period of time concerning the device ID used in step S253 and proceeds to step S256. In the case of the above-mentioned example, as a result of the updating, management is carried out such that the usable period of time will expire when further one month elapses from the present time.

That is, the user needs to transmit a request to the file server 20 using the smart device (step S11.2 in FIG. 17) within the usable period of time. That is, management needs to be carried out such that an interval of time of transmitting a request does not exceed the usable period of time.

Figure 19:
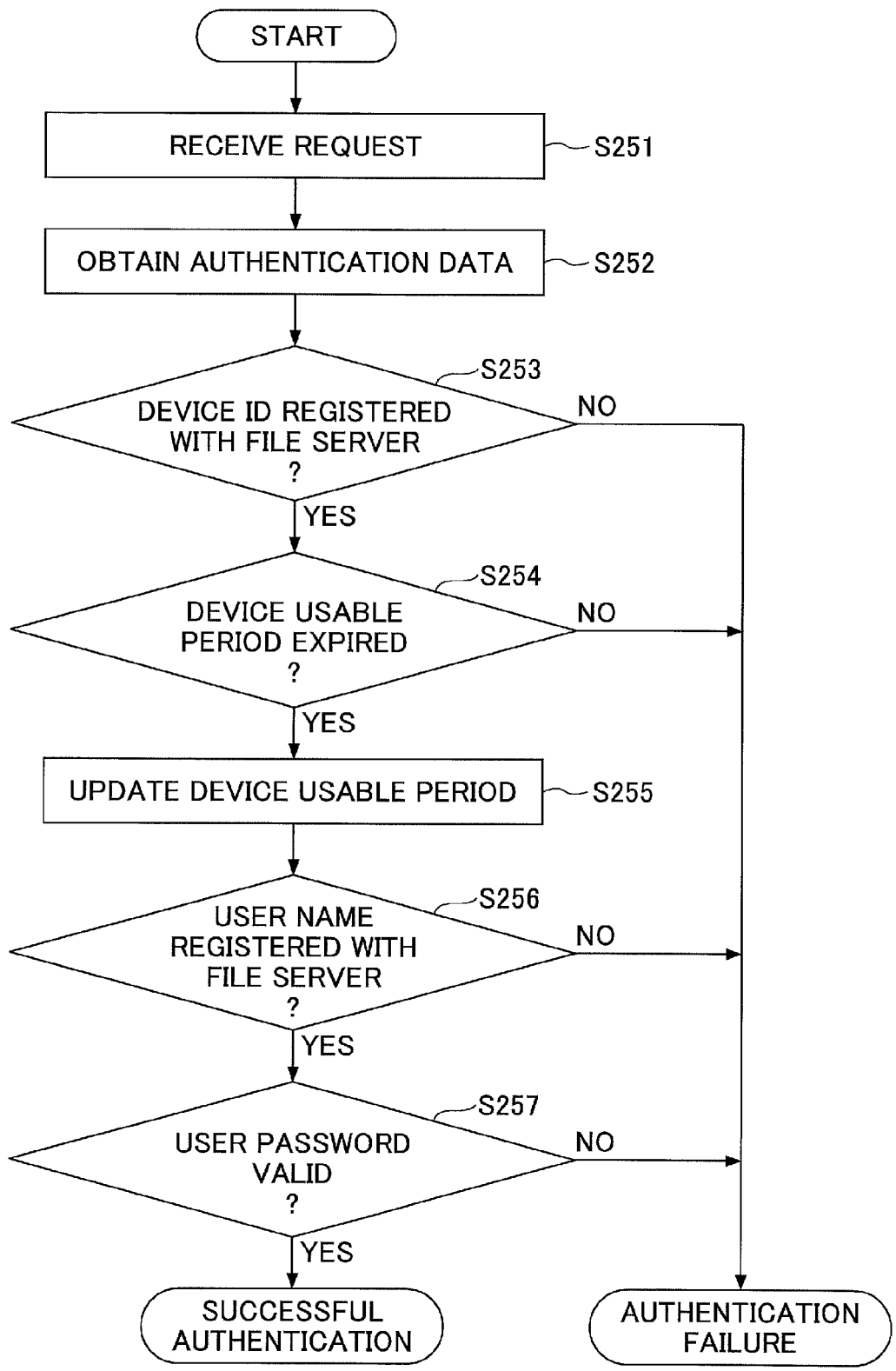
FIG. 19 is a sequence diagram illustrating a flow of operations of authenticating a terminal apparatus carried out by the file server shown in FIG. 1.

Returning to the description of FIG. 19, in step S256, the authentication part 271 determines whether the user name included in the user's account information included in the authentication information for service request obtained in step S252 is registered in the authentication information for service request 253.

When the determination result is that the user name is registered in the authentication information for service request 253 (YES at step S256), the authentication part 271 proceeds to step S257.

When the determination result is that the user name is not registered in the authentication information for service request 253 (NO at step S256), the authentication part 271 obtains an authentication result "authentication failure".

In step S257, the authentication part 271 determines whether the password included in the user's account information included in the authentication information for service request obtained in step S252 is registered in the authentication information for service request 253 in association with the user name used in step S256.

When the determination result is that the password is registered in the authentication information for service request 253 in association with the user name (YES at step S257), the authentication part 271 obtains an authentication result "successful authentication".

When the determination result is that the password is not registered in the authentication information for service request 253 in association with the user name (NO at step S257), the authentication part 271 obtains an authentication result "authentication failure".

Note that in the processes of FIG. 19, since the smart device 30 is associated with the specific user at the time of "device registration", it is not necessary to determine whether the pair of the device and the user is correct.

That is, a situation will now be assumed in which only a device ID among the authentication information for service request 253 shown in FIG. 14 is inadvertently disclosed and a third party uses it to access the file server 20. In such a situation, the third party does not have the account information corresponding to the device ID, and also, does not have any items of account information corresponding to the other device IDs managed in the authentication information for service request 253. For these items of account information, the corresponding device IDs are present, respectively. Therefore, if the third party had any one of the items of account information, the third party should be the owner of the device corresponding to the item of account information. In such a case, the third party should be one who is allowed to access the file server 20 using the own device and account information, and thus, should not be an unauthorized person.

Therefore, as long as assuming such a situation that either one of a device ID and user's account information is inadvertently disclosed, an unauthorized person has no information at all of the other one of the device ID and the user's account information included in the authentication information for service request 253. Therefore, what is to be determined is whether both the device ID and the user's account information are managed in the authentication information for service request 253 separately.

Further, when a user wishes to change his or her own account information in the authentication information for service request 253 into new one, the user logs in to the file server 20 using new account information ("input account information" in step S1.1 of FIG. 6). Thereafter, the procedure for "device registration" described above using FIG. 6 is carried out. As a result, it is possible to update the device information 252 and the authentication information for service request 253 with the new account information.

Further, when the user's account information associated with the device is deleted, also the corresponding device information is deleted. Therefore, when the user wishes to register new account information after deleting his or her own old account information, the user needs to carry out new "device registration" in the same way as that mentioned above.

Next, using FIG. 20, an example of a flow of processes for reading a file (data), stored in the file server 20, by the smart device 30 will be described.

The preview display part 308 in the smart device 30 responds to user's operations, creates a request for obtaining a file stored in the file server 20, includes authentication information for service request such as that shown in FIG. 18 in the request and transmits the request. Then, when the file server 20 receives the request and determines that the user who transmitted the request is a valid user, the file server 20 transmits the file (data) requested by the received request to the smart device 30. Thus, also the preview display part 308 is one example of the service request transmission part.

That is, in the same way as that of FIG. 17, when "device registration" of the smart device 30 with the file server 20 is completed, the preview display part 308 in the smart device 30 creates a "file obtaining request" (one example of the service use request) (step S21 "create data-to-read obtaining request"). At this time, the preview display part 308 also creates authentication information for service request to be included in the file obtaining request (step S21.1). The "file obtaining request" is one example of a data-to-read obtaining request.

Next, the preview display part 308 transmits the created file obtaining request to the file server 20 (step S21.2 "transmit data-to-read obtaining request").

The authentication part 271 in the file server 20 receives the file obtaining request from the smart device 30, carries out authentication using the authentication information for service request included in the received file obtaining request and obtains an authentication result.

When the thus obtained authentication result is "authentication failure" (see FIG. 19), the authentication part 271 notifies the smart device 03 of the authentication result "authentication failure" in response to the file obtaining request (step S21.2.1 "request failed").

On the other hand, when the authentication result is "successful authentication" (see FIG. 19), the authentication part 271 obtains the data of the file requested by the file obtaining request from the common folder 203 by the document management part 204. Then, in response to the file obtaining request, the authentication part 271 transmits the thus obtained data of the file to the smart device 30 (step S21.2.2 "transmit data-to-read"). Thus, the document management part 204, the common folder 203 and the authentication part 271 are one example of the service providing part.

After receiving the data of the file, the preview display part 308 in the smart device 30 displays the data of the file on display unit 36 (step S22 "display data-to-read").

Next, using FIG. 21, an example of a flow of processes for printing a file (data), stored in the file server 20, by the smart device 30 will be described.

The print management part 303 in the smart device 30 responds to user's operations, creates a print data obtaining request, includes authentication information for service request such as that shown in FIG. 18 therein and transmits the request. Then, when the file server 20 receives the request and determines that the user who transmitted the request is a valid user, the document management part 204 in the file server 20 creates print data from the file (data) requested by the received print data obtaining request and transmits the print data to the smart device 30. The print management part 303 in the smart device 30 transmits the thus received print data to the MFP 50, uses the MFP 50 as a printer and causes the MFP 50 to print the print data.

That is, in the same way as that of FIG. 17, when "device registration" of the smart device 30 with the file server 20 is completed, the print management part 303 in the smart device 30 creates the "print data obtaining request" (one example of the service use request) (step S31 "create print data obtaining request"). At this time, the print management part 303 also creates authentication information for service request to be included in the print data obtaining request (step S31.1).

Next, the print management part 303 transmits the created print data obtaining request to the file server 20 (step S31.2 "transmit print data obtaining request").

The authentication part 271 in the file server 20 receives the print data obtaining request from the smart device 30, carries out authentication using the authentication information for service request included in the received print data obtaining request and obtains an authentication result.

When the thus obtained authentication result is "authentication failure" (see FIG. 19), the authentication part 271 notifies the smart device 03 of the authentication result "authentication failure" in response to the print data obtaining request (step S31.2.1 "request failed").

On the other hand, when the authentication result is "successful authentication" (see FIG. 19), the document management part 204 obtains the data of the file requested by the print data obtaining request from the common folder 203. Then, the document management part 204 creates print data based on the data of the file (step S31.2.2 "create print data") and transmits the print data to the smart device 30 in response to the print data obtaining request (step S31.2.3 "transmit print data"). Thus, also in this case, the document management part 204, the common folder 203 and the authentication part 271 are one example of the service providing part.

After receiving the print data, the print management part 303 in the smart device 30 transmits the print data to the MFP 50 (step S32 "transmit print data") and causes the MFP 50 to print the print data.

Next, using FIG. 22, an example of a flow of processes for projecting a file (data), stored in the file server 20, by the smart device 30 will be described.

The smart device 30 creates a request for obtaining a file stored in the file server 20, includes authentication information for service request such as that shown in FIG. 18 therein and transmits the request. Then, when the file server 20 receives the request and determines that the user who transmitted the request is a valid user, the file server 20 transmits the file (data) requested by the received request to the smart device 30. The smart device 30 converts the received file into such a data format that the converted file can be used by the projector 60 to project the data of the file and transmits the converted file to the projector 60 which then projects the data of the file.

That is, in the same way as that of FIG. 17, when "device registration" of the smart device 30 with the file server 20 is completed, the projector management part 304 in the smart device 30 creates a "data-to-read obtaining request" (one example of the service use request) (step S41). At this time, the projector management part 304 also creates authentication information for service request to be included in the data-to-read obtaining request (step S41.1).

Next, the projector management part 304 transmits the created data-to-read obtaining request to the file server 20 (step S41.2).

The authentication part 271 in the file server 20 receives the data-to-read obtaining request from the smart device 30, carries out authentication using the authentication information for service request included in the received data-to-read obtaining request and obtains an authentication result.

When the thus obtained authentication result is "authentication failure" (see FIG. 19), the authentication part 271 notifies the smart device 03 of the authentication result "authentication failure" in response to the data-to-read obtaining request (step S41.2.1 "request failed").

On the other hand, when the authentication result is "successful authentication" (see FIG. 19), the document management part 204 obtains the data of the file requested by the data-to-read obtaining request from the common folder 203. Then, in response to the data-to-read obtaining request, the document management part 204 transmits the thus obtained data of the file to the smart device 30 (step S41.2.2 "transmit data-to-read"). Thus, also in this case, the document management part 204, the common folder 203 and the authentication part 271 are one example of the service providing part.

After receiving the data of the file, the preview display part 308 in the smart device 30 displays the data of the file on display unit 36 (step S42 "display data-to-read").

Next, the projector management part 304 in the smart device 30 creates projection data based on the received data of the file (step S43 "create projection data"), transmits the projection data to the projector 60 which then projects the projection data.

Next, using FIG. 23, one example of a flow of processes for deleting device information registered in the database 220 in the file server 20 will be described.

Deletion of device information is carried out from the client PC 10. A user logs in the file server 20 from the client PC 10 and operates the client PC to display a "device management screen page". The "device management screen page" shows a list of devices registered with the file server 20. Therefore, the user is allowed to select a device from among the list and operates the client PC 10 to delete the corresponding device information.

Figure 23:
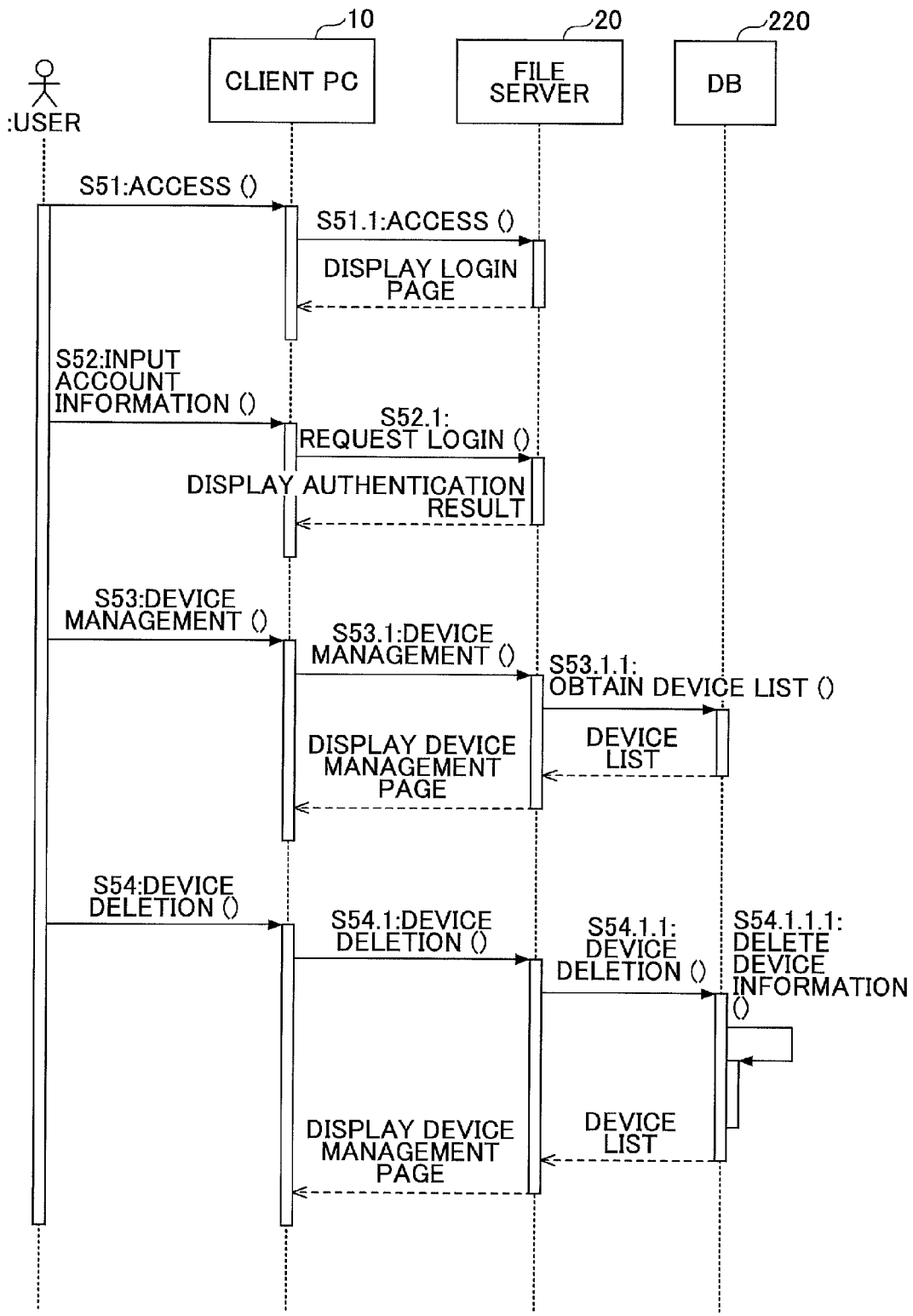
FIG. 23 is a sequence diagram illustrating a flow of processes for deleting device information that is registered in the file server shown in FIG. 1.

In FIG. 23, the procedure in steps S51 to S52.1 is the same as the procedure in steps S1 to S2.1 in FIG. 6 and duplicate description will be omitted.

In step S53, the user operates the client PC 10 to display a device management screen page (step S53 "device management") and the client PC 10 requests the device management screen page from the file server 20 (step S53.1 "device management").

The authentication management part 209 in the file server 20 receives the request and requests a list of devices from the database 220 (step S53.1.1 "obtain device list"). The database 220 responds to the request, creates information of a list of devices from the registered device information 252 and sends the created list of devices to the authentication management part 209. The authentication management part 209 displays the device management screen page showing the list of devices on the display unit of the client PC 10 by controlling the PC browser UI 205 based on the received information of the list of devices ("display device management page").

The user views the thus displayed device management screen page and operates the client PC 10 to delete a device for which the device information is to be deleted (step S54 "device deletion"). In response thereto, the client PC 10 sends such an instruction to the PC browser UI 205 in the file server 20 as to delete the device information of the selected device (step S54.1 "device deletion"). The above-mentioned operations to delete the device are one example of inputting a "device deleting request".

The authentication management part 209 in the file server 20 responds to the instruction and sends such an instruction to the database 220 as to delete the device information of the corresponding device (step S54.1.1 "device deletion"). In response thereto, the database 220 deletes the device information of the corresponding device (step S54.1.1.1 "delete device information"). Thus, the authentication management part 209 is one example of a registration deletion part.

Next, the database 220 sends information of a list of devices after the deletion to the PC browser UI 205 ("device list"). The PC browser UI 205 displays the device management screen page showing the list of devices on the display unit of the client PC 10 ("display device management page").

The user views the thus delayed device management screen page and confirms that the device information of the device for which the user carried out the deletion operations in step S54 is actually deleted.

Note that when the device information of a device is thus deleted, the authentication information for service request of the corresponding user managed in the authentication information for service request 253 in the database 220 in association with the device information is deleted simultaneously.

Note that according to the above-described embodiment, the single file server 20 includes the authentication part 271 and the QR code generation part 272. However, embodiments of the present invention are not limited to such an example. That is, an embodiment can be implemented in which the functions of the file server 20 are shared by a plurality of servers. For example, from among the functions of the file server 20, at least either one of the authentication part 271 and the QR code generation part 272 can be provided in a server other than the file server 20.

Thus, the information processing system, the information processing apparatus and the information processing method have been described in the embodiment. However, the present invention is not limited to the specifically disclosed embodiment and variations and modifications may be made without departing from the scope of the present invention.

The present application is based on and claims the benefit of priority of Japanese Priority Application No. 2013-054314, dated Mar. 15, 2013, and Japanese Priority Application No. 2014-033388, dated Feb. 24, 2014, the entire contents of which are hereby incorporated herein by reference.

What is claimed is:

1. A system, comprising:
a client device;
an information processing apparatus; and
a terminal,
wherein the information processing apparatus includes
a first memory that stores a first program, and
a first processor that executes the first program to perform a first process including
receiving user information indicating a user and a generation request for generating authentication information from the client device,
generating the authentication information in response to the generation request,
displaying an image including the generated authentication information on a display unit of the client device,
storing the authentication information included in the displayed image and the user information in association with each other in the first memory,
receiving authentication information and device information indicating the terminal, from the terminal,
when the received authentication information matches the stored authentication information, storing the received device information in the first memory in association with the user information stored in association with the stored authentication information,
receiving an execution request requesting execution of a requested process from the terminal, and
executing the requested process when device information indicating the terminal is stored in the first memory;
wherein the terminal includes
a second memory that stores a second program, and
a second processor that executes the second program to perform a second process including
obtaining the authentication information from the image displayed on the display unit of the client device,
transmitting the obtained authentication information and the device information indicating the terminal to the information processing apparatus, and
after transmitting the authentication information and the device information to the information processing apparatus, transmitting the execution request requesting execution of the requested process to the information processing apparatus.

2. The system as claimed in claim 1, wherein the first process performed by the first processor of the information processing apparatus further includes
receiving a deletion request requesting deletion of the device information stored in the first memory of the information processing apparatus; and
in response to the received deletion request, deleting the device information stored in the first memory of the information processing apparatus.

3. The system as claimed in claim 1, wherein the first process performed by the first processor of the information processing apparatus further includes
when storing the authentication information included in the displayed image in the first memory, storing a term of validity of the authentication information in the first memory; and
when the term of validity expires, deleting the authentication information.

4. The system as claimed in claim 1, wherein the first process performed by the first processor of the information processing apparatus further includes
when the user information and the generation request are received, and the user information is already stored in the first memory in association with the authentication information,
deleting the authentication information stored in the first memory;
generating authentication information different from the deleted authentication information; and
storing the generated authentication information in the first memory in association with the user information.

5. The system as claimed in claim 1,
wherein the image includes identification information of the information processing apparatus; and
wherein the second process performed by the second processor of the terminal further includes
obtaining the authentication information and the identification information of the information processing apparatus from the image displayed by the information processing apparatus,
transmitting the obtained authentication information and the device information indicating the terminal to the information processing apparatus based on the obtained identification information of the information processing apparatus, and
after transmitting the device information and the authentication information to the information processing apparatus, transmitting the execution request to the information processing apparatus based on the obtained identification information of the information processing apparatus.

6. The system as claimed in claim 5,
wherein the image further includes identification information of a relay apparatus; and
wherein the second process performed by the second processor of the terminal further includes
obtaining the authentication information, the identification information of the information processing apparatus, and the identification information of the relay apparatus from the image displayed by the information processing apparatus,
transmitting the obtained authentication information, the device information indicating the terminal, and the obtained identification information of the information processing apparatus to the relay apparatus based on the obtained identification information of the relay apparatus, and
after transmitting the device information and the authentication information to the information processing apparatus, transmitting the execution request to the information processing apparatus based on the obtained identification information of the information processing apparatus.

7. The system as claimed in claim 1, wherein the first process performed by the first processor of the information processing apparatus further includes
when the received authentication information matches the stored authentication information, deleting the stored authentication information.

8. The system as claimed in claim 1, wherein the second process performed by the second processor of the terminal further includes
creating a terminal registration request based on the authentication information included in the displayed image on the display unit of the client device and sending the terminal registration request to the information processing apparatus to register the terminal, and
upon a successful registration of the terminal, receiving a notification from the information processing apparatus of account information of a user who initiated a registration process of the terminal via the client device.

9. An information processing method, comprising:
performing, via an information processing apparatus that includes a first memory that stores a first program, and a first processor that executes the first program, a first process including
receiving user information indicating a user and a generation request for generating authentication information from a client device,
generating the authentication information in response to the generation request,
displaying an image including the generated authentication information on a display unit of the client device,
storing the authentication information included in the displayed image and the user information in association with each other in the first memory,
receiving authentication information and device information indicating a terminal from the terminal,
when the received authentication information matches the stored authentication information, storing the received device information in the first memory in association with the user information stored in association with the stored authentication information,
receiving an execution request requesting execution of a requested process from the terminal, and
executing the requested process when device information indicating the terminal is stored in the first memory; and
performing, via the terminal that includes a second memory that stores a second program, and a second processor that executes the second program, a second process including
obtaining the authentication information from the image displayed on the display unit of the client device,
transmitting the obtained authentication information and the device information indicating the terminal to the information processing apparatus, and
after transmitting the authentication information and the device information to the information processing apparatus, transmitting the execution request requesting execution of the requested process to the information processing apparatus.

* * * * *